(12) United States Patent
Barroux et al.

(10) Patent No.: US 11,218,705 B2
(45) Date of Patent: Jan. 4, 2022

(54) INFORMATION PROCESSING DEVICE AND VIDEO ENCODING METHOD

(71) Applicant: FUJITSU LIMITED, Kawasaki (JP)

(72) Inventors: Guillaume Denis Christian Barroux, Kawasaki (JP); Kohji Yamada, Kawasaki (JP); Akira Nakagawa, Sagamihara (JP); Kimihiko Kazui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/937,689

(22) Filed: Jul. 24, 2020

(65) Prior Publication Data

US 2020/0359031 A1 Nov. 12, 2020

Related U.S. Application Data

(63) Continuation of application No. PCT/JP2018/002989, filed on Jan. 30, 2018.

(51) Int. Cl.
*H04N 19/159* (2014.01)
*H04N 19/13* (2014.01)
(Continued)

(52) U.S. Cl.
CPC .......... *H04N 19/159* (2014.11); *H04N 19/13* (2014.11); *H04N 19/176* (2014.11); *H04N 19/46* (2014.11)

(58) Field of Classification Search
CPC .... H04N 19/159; H04N 19/13; H04N 19/176; H04N 19/46; H04N 19/15; H04N 19/82;
(Continued)

(56) References Cited

U.S. PATENT DOCUMENTS

| 8,811,761 B2 * | 8/2014 | Sasai ............... H04N 19/44 382/238 |
| 9,344,744 B2 * | 5/2016 | Kirchhoffer ......... H04N 19/11 |

(Continued)

FOREIGN PATENT DOCUMENTS

| JP | 2009-111691 A | 5/2009 |
| JP | 2012-135033 A | 7/2012 |

(Continued)

OTHER PUBLICATIONS

Seung-Hwan Kim et al., "Further Improvement of Intra Coding Tools", Joint Video Exploration Team (JVET), 2nd Meeting, San Diego, USA, JVET-B0051, pp. 1-4, Feb. 20-26, 2016 (Total 4 pages).

(Continued)

*Primary Examiner* — Boubacar Abdou Tchoussou
(74) *Attorney, Agent, or Firm* — Fujitsu Patent Center

(57) ABSTRACT

An information processing device includes: a memory; and a processor coupled to the memory and configured to: determine an angle of intra prediction for a block to be encoded in an image included in a video, and encode the block to be encoded using the angle of intra prediction; generate a bit value indicating an estimation result of the angle using a locally decoded pixel value of an encoded pixel adjacent to the block to be encoded; generate a bit string indicating the angle of intra prediction and generate flag information indicating whether a partial bit value of the bit string matches the bit value indicating an estimation result of the angle; and encode the flag information by a first encoding method and encode a remaining bit value of the bit string by a second encoding method.

11 Claims, 24 Drawing Sheets

(51) Int. Cl.
*H04N 19/176* (2014.01)
*H04N 19/46* (2014.01)

(58) Field of Classification Search
CPC ...... H04N 19/124; H04N 19/11; H04N 19/70; H04N 19/593
See application file for complete search history.

(56) References Cited

U.S. PATENT DOCUMENTS

| | | | |
|---|---|---|---|
| 9,838,034 B2* | 12/2017 | Chuang | H04N 19/436 |
| 2009/0110070 A1 | 4/2009 | Takahashi et al. | |
| 2010/0177975 A1 | 7/2010 | Kim et al. | |
| 2013/0034158 A1* | 2/2013 | Kirchhoffer | H04N 19/11 375/240.12 |
| 2013/0136375 A1* | 5/2013 | Sasai | H04N 19/136 382/238 |
| 2013/0148726 A1 | 6/2013 | Han et al. | |
| 2015/0003524 A1 | 1/2015 | Yamamoto et al. | |
| 2016/0269750 A1 | 9/2016 | Yasugi | |
| 2017/0041022 A1* | 2/2017 | Chuang | H04N 19/91 |
| 2017/0164002 A1 | 6/2017 | Lee et al. | |
| 2019/0238841 A1* | 8/2019 | Lee | H04N 19/513 |

FOREIGN PATENT DOCUMENTS

| | | |
|---|---|---|
| JP | 2012-205288 A | 10/2012 |
| JP | 2013-078161 A | 4/2013 |
| JP | 2016-201829 A | 12/2016 |
| JP | 2017-143542 A | 8/2017 |
| JP | 2017-200231 A | 11/2017 |
| WO | 2012/034690 A1 | 3/2012 |

OTHER PUBLICATIONS

Sakae Okubo et al., "H.265/HEVC Textbook", First Edition, pp. 115-117, Jul. 3, 2014, Impress Japan (Total 5 pages with partial translation).

Jianle Chen et al., "Algorithm Description of Joint Exploration Test Model 7 (JEM 7)", Joint Video Exploration Team (JVET), 7th Meeting: Torino, Italy: JVET-G1001-v1, pp. 6-9, Aug. 19, 2017 (Total 5 pages).

International Search Report and Written Opinion of the International Searching Authority (Form PCT/ISA/210, 220, and 237), mailed in connection with PCT/JP2018/002989 and dated Apr. 10, 2018 (Total 11 pages).

International Telecommunication Union, Series H: Audiovisual and Multimedia Systems, Infrastructure of audiovisual services—Coding of moving video, "High efficiency video coding", Recommendation ITU-T H.265, ITU-T Telelcommunication Standardization Sector of ITU, pp. 52-54, 208, 225-232, Dec. 2016.

Japanese Office Action dated Feb. 24, 2021 for corresponding Japanese Patent Application No. 2019-568431, with English Translation, 9 pages.

\* cited by examiner

FIG. 15A

| i | 0 | 1 | 2 | 3 | 4 | 5 | 6 | 7 |
|---|---|---|---|---|---|---|---|---|
| w(i) | 1/128 | 1/128 | 1/64 | 1/32 | 1/16 | 1/8 | 1/4 | 1/2 |

FIG. 15B

| i | 0 | 1 | 2 | 3 |
|---|---|---|---|---|
| w(i) | 1/8 | 1/8 | 1/4 | 1/2 |

INFORMATION PROCESSING DEVICE AND VIDEO ENCODING METHOD

CROSS-REFERENCE TO RELATED APPLICATION

This application is a continuation application of International Application PCT/JP2018/002989 filed on Jan. 30, 2018 and designated the U.S., the entire contents of which are incorporated herein by reference.

FIELD

The embodiments discussed herein are related to a video encoding device, a video encoding method, a video decoding device, a video decoding method, and a video encoding system.

BACKGROUND

In high efficiency video coding (HEVC) that is the latest video encoding standard, two prediction methods of inter prediction and intra prediction are adopted as prediction methods for encoding a block to be encoded using information of an encoded block. The inter prediction is a prediction method using a pixel value of a block located temporally close to a block to be encoded, and the intra prediction is a prediction method using a pixel value of a block located at close distance to the block to be encoded.

Japanese Laid-open Patent Publication No. 2012-135033, Japanese Laid-open Patent Publication No. 2013-078161, and Japanese Laid-open Patent Publication No. 2017-143542 are disclosed as related art.

SUMMARY

According to an aspect of the embodiments, an information processing device includes: a memory; and a processor coupled to the memory and configured to: determine an angle of intra prediction for a block to be encoded in an image included in a video, and encode the block to be encoded using the angle of intra prediction; generate a bit value indicating an estimation result of the angle using a locally decoded pixel value of an encoded pixel adjacent to the block to be encoded; generate a bit string indicating the angle of intra prediction and generate flag information indicating whether a partial bit value of the bit string matches the bit value indicating an estimation result of the angle; and encode the flag information by a first encoding method and encode a remaining bit value of the bit string by a second encoding method.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 15A and 15B are diagrams illustrating weights w(i)

DESCRIPTION OF EMBODIMENTS

Furthermore, in HEVC, context-adaptive binary arithmetic coding (CABAC) with high compression efficiency is adopted as a variable-length encoding method.

In standardization activity of future video coding (FVC) that is a next-generation video encoding standard, further improvement in compression efficiency is being studied.

In HEVC, prediction mode information indicating an angle of intra prediction is encoded by CABAC. However, a code amount of the prediction mode information indicating an angle is not sufficiently compressed.

Note that such a problem occurs not only in video encoding using HEVC but also in other video encoding using intra prediction.

In one aspect, a code amount of prediction mode information indicating an angle of intra prediction in video encoding may be reduced.

Hereinafter, embodiments will be described in detail with reference to the drawings.

Figure 1:
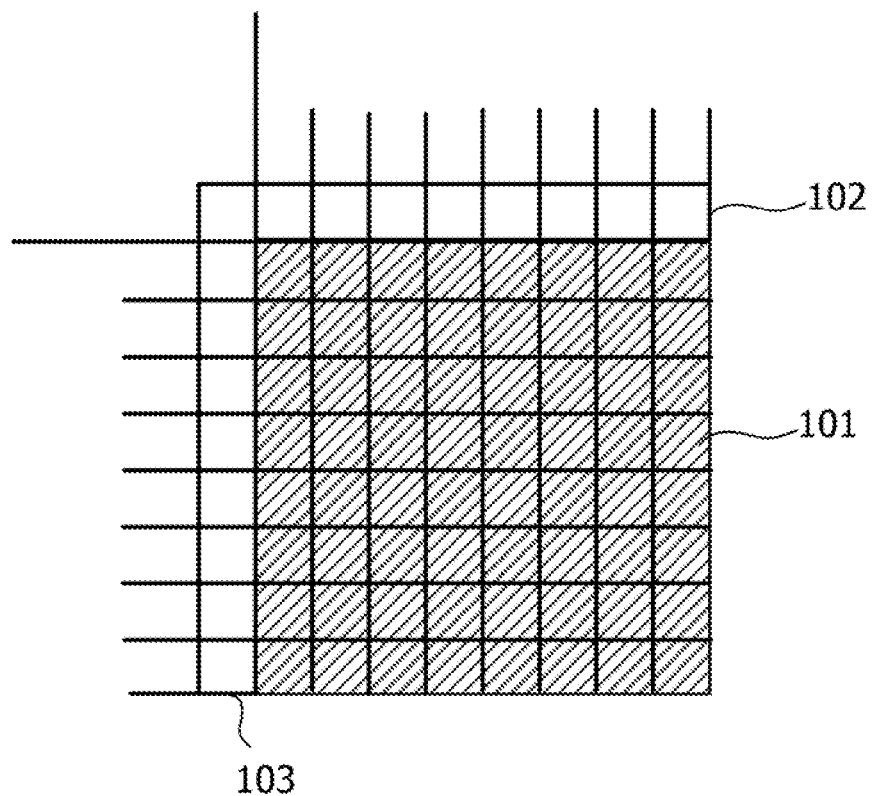
FIG. 1 is a diagram illustrating intra prediction encoding.

FIG. 1 illustrates an example of intra prediction encoding for a block to be encoded. In intra prediction encoding, an encoded pixel in an image including a block to be encoded 101 is used as a reference pixel, and a pixel value of the block to be encoded 101 is predicted using a locally decoded pixel value of the reference pixel. Then, a prediction error and prediction mode information indicating a prediction method are encoded.

In the example in FIG. 1, an upper adjacent pixel 102 in an upper adjacent block located above the block to be encoded 101 and a left adjacent pixel 103 in a left adjacent block located on the left side of the block to be encoded 101 are used as the reference pixels. The upper adjacent pixel 102 is a pixel adjacent to a side in a horizontal direction of the block to be encoded 101 among pixels in the upper adjacent block, and the left adjacent pixel 103 is a pixel adjacent to a side in a vertical direction of the block to be encoded 101 among pixels in the left adjacent block.

In HEVC, three types of prediction modes of a direct current (DC) mode, a planar mode, and an angular mode are defined as intra prediction modes. Among the prediction modes, in the angular mode, one angle is selected for each block to be encoded, and a prediction pixel value of each pixel the block to be encoded 101 is generated using the reference pixel located in a direction indicated by the selected angle. In HEVC, thirty-three angles are defined as angles in the angular mode, but in FVC, it is expected that the angle is extended to sixty-five angles.

Figure 2:
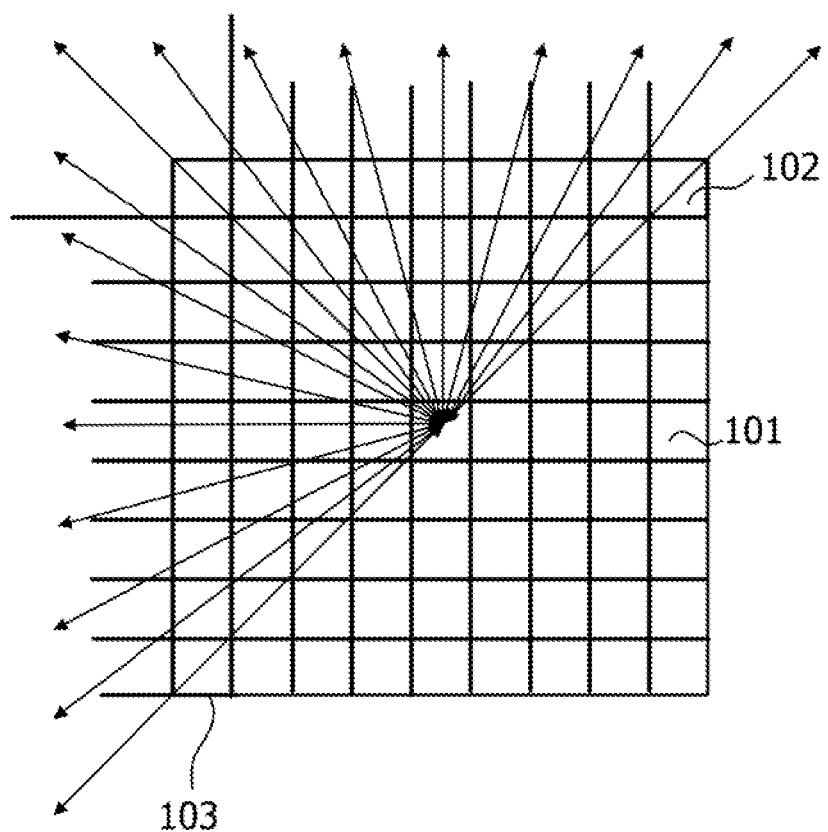
FIG. 2 is a diagram illustrating angles of intra prediction.

FIG. 2 illustrates an example of angles of intra prediction for the block to be encoded. In this example, for simplicity, seventeen directions are illustrated using seventeen arrows. In the case where the number of angles in the angular mode is N (N is an integer of 1 or larger), these angles can be illustrated using the N arrows.

Figure 3:
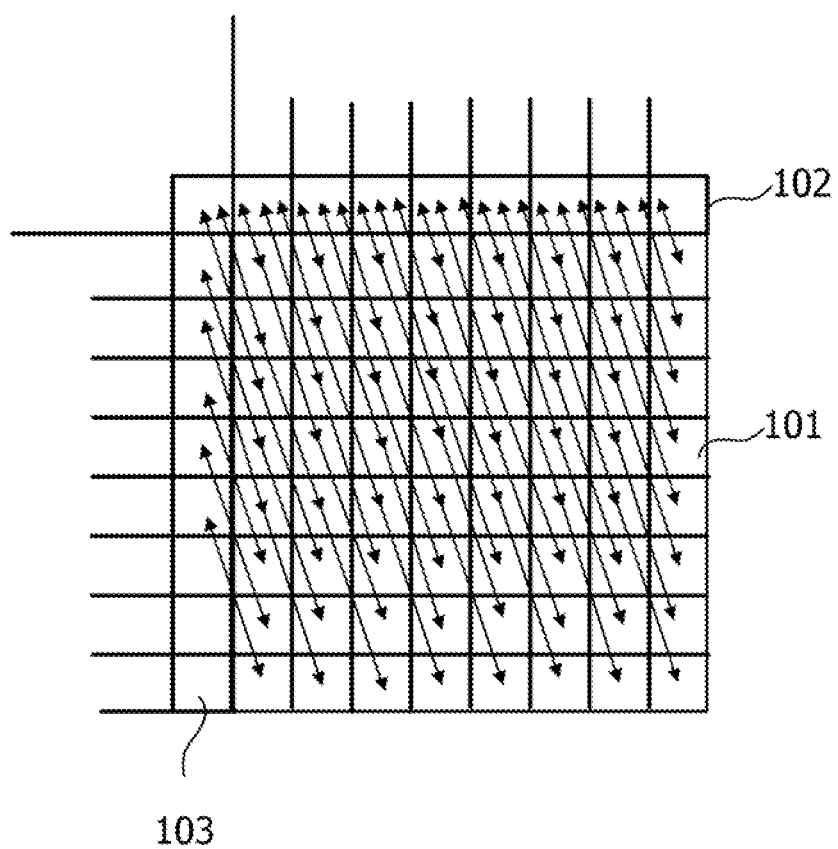
FIG. 3 is a diagram illustrating intra prediction in an angular mode.

FIG. 3 illustrates an example of intra prediction in the angular mode. In this example, a reference pixel located in an upper left direction indicated by an arrow is specified from each pixel in the block to be encoded 101, and those reference pixels are extrapolated along the upper left direction, so that prediction pixel values of the pixels are generated.

In the case where intra prediction in the angular mode is performed, prediction mode information indicating the angle used in the intra prediction is encoded. To efficiently encode the prediction mode information indicating the angle, a most probable mode (MPM) table is used.

The most probable mode for the block to be encoded is predicted from the angular mode of a surrounding encoded block, and in HEVC, three types of prediction methods are defined. By encoding a difference between the predicted most probable mode and the actual angular mode, the amount of prediction mode information indicating the angle may be reduced.

In the case of HEVC, a 5-bit bit string is used to express thirty-two angles except for the most probable mode out of thirty-three angles. Meanwhile, in the case of FVC, it is expected to use a 6-bit bit string to express sixty-four angles except for the most probable mode out of sixty-five angles.

A quantized coefficient and the prediction mode information of the block to be encoded are encoded by CABAC. The processing procedure of CABAC adopted in HEVC is as follows.

(1) Binarization

A multi-level syntax element in syntax elements to be encoded is converted into a binary signal (bin) that is to be a signal to be arithmetic-encoded.

(2) Context Modeling

In a context mode, an occurrence probability model used for arithmetic coding is determined according to a value of another syntax element, a value of a syntax element adjacent to a region to be encoded, or the like, for each bin of a syntax element. In this case, the occurrence probability of each value of logic "0" and logic "1" is variable.

On the other hand, for bins for which estimation of the occurrence probability is difficult, a bypass mode in which the occurrence probability of each value of logic "0" and logic "1" is fixed to 0.5 is selected.

(3) Arithmetic Encoding

A real number line from 0 to less than 1 is sequentially divided into sections on the basis of the occurrence probability of an occurring symbol, and a codeword in binary notation is generated from a real number indicating a finally divided section.

In the arithmetic coding in the bypass mode, the code amount is not compressed. However, since probability estimation processing is skipped and an arithmetic amount in the real number linear division processing is reduced, the encoding processing is speeded up and a storage area of a memory for storing the occurrence probability is reduced.

However, since the prediction mode information indicating angles except for the most probable mode is encoded in the bypass mode of CABAC, the compression efficiency of the prediction mode information is low.

Figure 4:
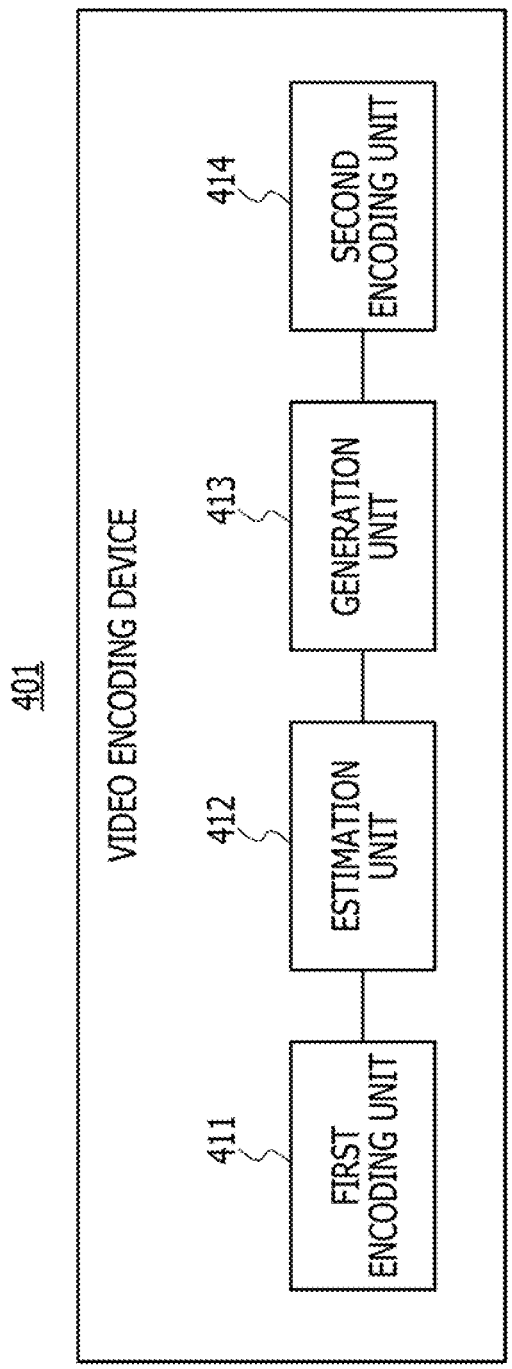
FIG. 4 is a functional configuration diagram of a video encoding device.

FIG. 4 illustrates a functional configuration example of a video encoding device according to the embodiment. A video encoding device 401 in FIG. 4 includes a first encoding unit 411, an estimation unit 412, a generation unit 413, and a second encoding unit 414.

Figure 5:
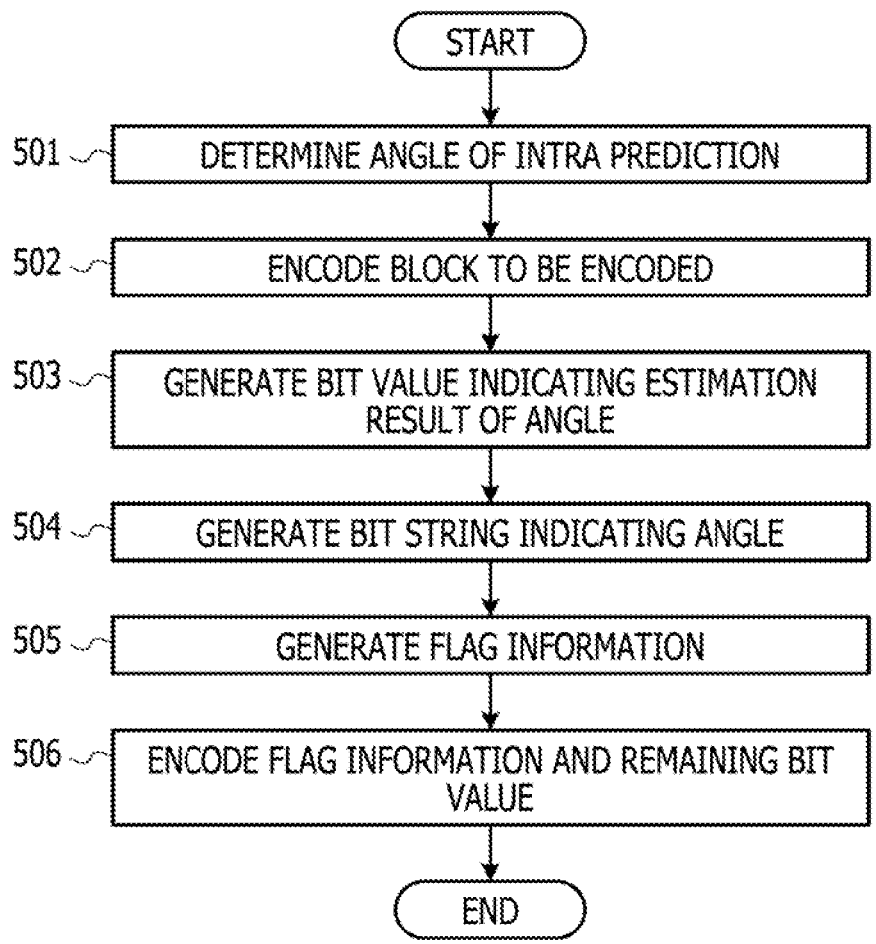
FIG. 5 is a flowchart of video encoding processing.

FIG. 5 is a flowchart illustrating an example of video encoding processing performed by the video encoding device 401 in FIG. 4. First, the first encoding unit 411 determines an angle of intra prediction for a block to be encoded in an image included in a video (step 501) and encodes the block to be encoded using the angle of intra prediction (step 502). Next, the estimation unit 412 generates a bit value indicating an estimation result of the angle using a locally decoded pixel value of an encoded pixel adjacent to the block to be encoded (step 503).

Next, the generation unit 413 generates a bit string indicating the angle of intra prediction (step 504) and generates flag information indicating whether a partial bit value of a bit string matches the bit value indicating an estimation result of the angle (step 505). Then, the second encoding unit 414 encodes the flag information by a first encoding method and encodes a remaining bit value of the bit string by a second encoding method (step 506).

Figure 6:
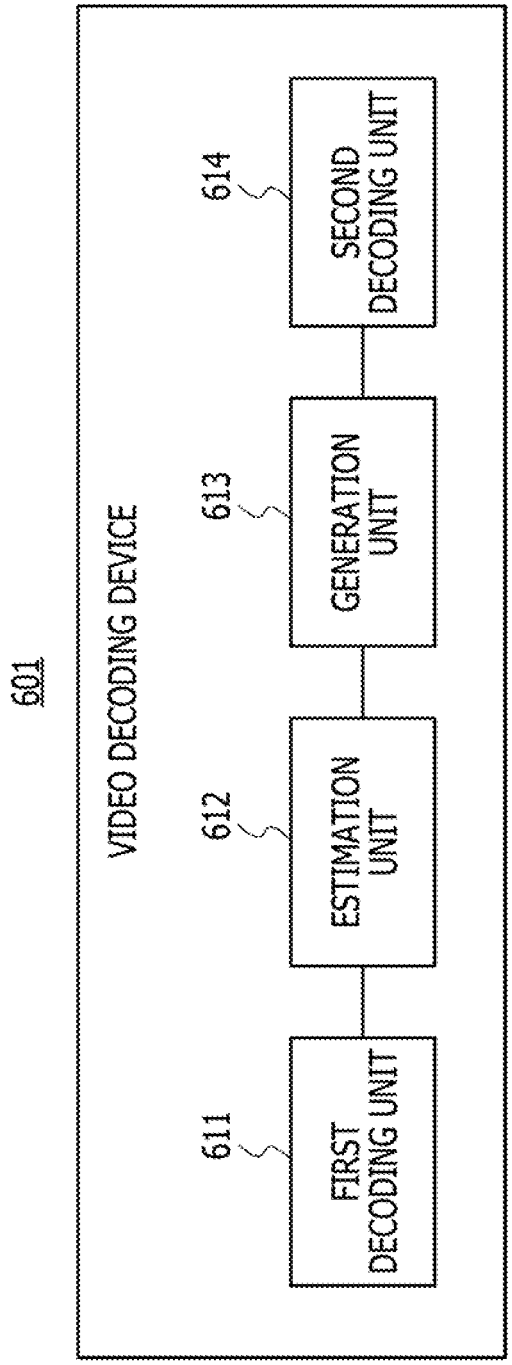
FIG. 6 is a functional configuration diagram of a video decoding device.

FIG. 6 illustrates a functional configuration example of a video decoding device according to the embodiment. A video decoding device 601 in FIG. 6 includes a first decoding unit 611, an estimation unit 612, a generation unit 613, and a second decoding unit 614.

Figure 7:
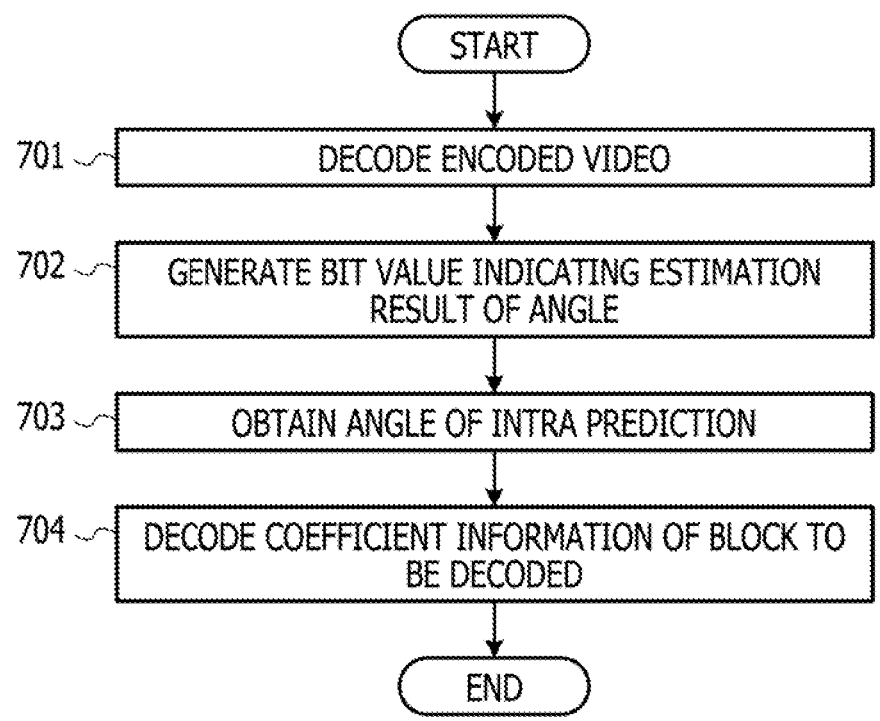
FIG. 7 is a flowchart of video decoding processing.

FIG. 7 is a flowchart illustrating an example of video decoding processing performed by the video decoding device 601 in FIG. 6. First, the first decoding unit 611 decodes an encoded video by a first decoding method to restore flag information (step 701). The flag information indicates whether a partial bit value of a bit string indicating an angle of intra prediction for a block to be decoded in an image included in the encoded video matches a bit value indicating an estimation result of the angle. Then, the first decoding unit 611 decodes the encoded video by a second decoding method to restore a remaining bit value of the bit string.

Next, the estimation unit 612 generates the bit value indicating an estimation result of the angle using a decoded pixel value of a decoded pixel adjacent to the block to be decoded (step 702). Next, the generation unit 613 generates the partial bit value of a bit string from the bit value indicating an estimation result of the angle on the basis of the flag information, and obtains the angle of intra prediction using the partial bit value of the bit string and the remaining bit value of the bit string (step 703). Then, the second decoding unit 614 decodes coefficient information of the block to be decoded using the angle of intra prediction (step 704).

According to the video encoding device 401 in FIG. 4 and the video decoding device 601 in FIG. 6, the code amount of the prediction mode information indicating the angle of intra prediction in the video encoding may be reduced.

Figure 8:
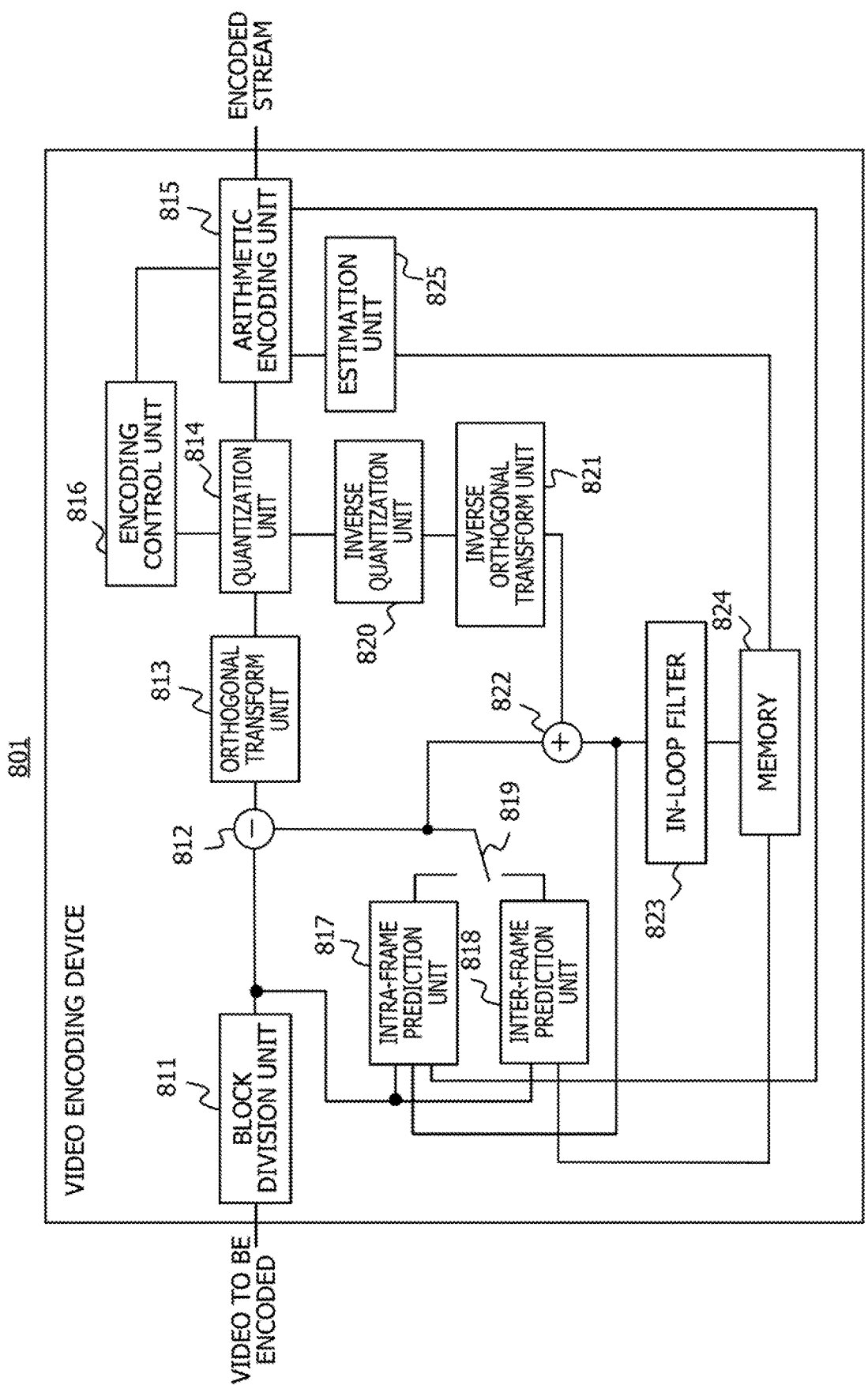
FIG. 8 is a functional configuration diagram illustrating a specific example of the video encoding device.

FIG. 8 illustrates a specific example of the video encoding device 401 in FIG. 4. A video encoding device 801 in FIG. 8 includes a block division unit 811, a prediction error generation unit 812, an orthogonal transform unit 813, a quantization unit 814, an arithmetic encoding unit 815, and an encoding control unit 816. Moreover, the video encoding device 801 includes an intra-frame prediction unit 817, an inter-frame prediction unit 818, a selection unit 819, an inverse quantization unit 820, an inverse orthogonal transform unit 821, a reconstruction unit 822, an in-loop filter 823, a memory 824, and an estimation unit 825.

The prediction error generation unit 812, the orthogonal transform unit 813, the quantization unit 814, the intra-frame prediction unit 817, the inter-frame prediction unit 818, the selection unit 819, the inverse quantization unit 820, the inverse orthogonal transform unit 821, the reconstruction unit 822, and the in-loop filter 823 correspond to the first encoding unit 411 in FIG. 4. Furthermore, the estimation unit 825 corresponds to the estimation unit 412 in FIG. 4.

The video encoding device 801 can be implemented as, for example, a hardware circuit. In this case, each constituent element of the video encoding device 801 may be implemented as an individual circuit or may be implemented as one integrated circuit.

The video encoding device 801 encodes an input video to be encoded and outputs an encoded video as an encoded stream. The video encoding device 801 can transmit the encoded stream to the video decoding device 601 in FIG. 6 via a communication network.

The video to be encoded includes a plurality of images respectively corresponding to a plurality of times. The image at each time corresponds to an image to be encoded and is sometimes called picture or frame. Each image may be a color image or a monochrome image. In the case of a color image, the pixel values may be in RGB format or in YUV format.

The block division unit 811 divides the image to be encoded into a plurality of blocks and outputs an original image of the block to be encoded to the prediction error generation unit 812, the intra-frame prediction unit 817, and the inter-frame prediction unit 818.

The intra-frame prediction unit 817 performs intra prediction for the block to be encoded, outputs a predicted image of the intra prediction to the selection unit 819, and outputs prediction mode information indicating a prediction method of the intra prediction to the arithmetic encoding unit 815. In the case of intra prediction in the angular mode, any one of N prediction directions indicated by N different angles is selected. The inter-frame prediction unit 818 performs inter prediction for the block to be encoded and outputs a predicted image of the inter prediction to the selection unit 819.

The selection unit 819 selects a predicted image output by either the intra-frame prediction unit 817 or the inter-frame prediction unit 818 and outputs the selected predicted image to the prediction error generation unit 812 and the reconstruction unit 822. The prediction error generation unit 812 outputs a difference between the predicted image output by the selection unit 819 and the original image of the block to be encoded to the orthogonal transform unit 813 as a prediction error.

The orthogonal transform unit 813 performs orthogonal transform for the prediction error output by the prediction error generation unit 812 and outputs a transform coefficient to the quantization unit 814. The quantization unit 814 quantizes the transform coefficient and outputs a quantized coefficient to the arithmetic encoding unit 815 and the inverse quantization unit 820.

The estimation unit 825 generates a bit value indicating an estimation result of the angle of intra prediction for the block to be encoded using a locally decoded pixel value of an encoded pixel adjacent to the block to be encoded, and outputs the generated bit value to the arithmetic encoding unit 815.

The arithmetic encoding unit 815 encodes the quantized coefficient output by the quantization unit 814 and the prediction mode information output by the intra-frame prediction unit 817 by CABAC, and outputs the encoded stream. Then, the arithmetic encoding unit 815 outputs an information amount generated by CABAC to the encoding control unit 816.

The inverse quantization unit 820 performs inverse quantization for the quantized coefficient output by the quantization unit 814 to generate an inversely quantized coefficient, and outputs the generated inversely quantized coefficient to the inverse orthogonal transform unit 821. The inverse orthogonal transform unit 821 performs inverse orthogonal transform for the inversely quantized coefficient to generate a prediction error, and outputs the generated prediction error to the reconstruction unit 822.

The reconstruction unit 822 adds the predicted image output by the selection unit 819 and the prediction error output by the inverse orthogonal transform unit 821 to generate a reconstructed image, and outputs the generated reconstructed image to the in-loop filter 823. The in-loop filter 823 performs filter processing of a deblocking filter or the like for the reconstructed image output by the reconstruction unit 822 to generate a locally decoded image, and outputs the generated locally decoded image to the memory 824.

The memory 824 stores the locally decoded image output by the in-loop filter 823. The locally decoded image stored in the memory 824 is output to the intra-frame prediction unit 817, the inter-frame prediction unit 818, and the estimation unit 825. The intra-frame prediction unit 817 uses a locally decoded pixel value included in the locally decoded image as a reference pixel value for a subsequent block, and the inter-frame prediction unit 818 uses the locally decoded image as a reference image for a subsequent image. The estimation unit 825 uses the locally decoded pixel value included in the focally decoded image as the locally decoded pixel value of the encoded pixel.

The encoding control unit 816 determines a quantization parameter (QP) so that the information amount output by the arithmetic encoding unit 815 becomes a target information amount, and outputs the determined QP to the quantization unit 814.

Figure 9:
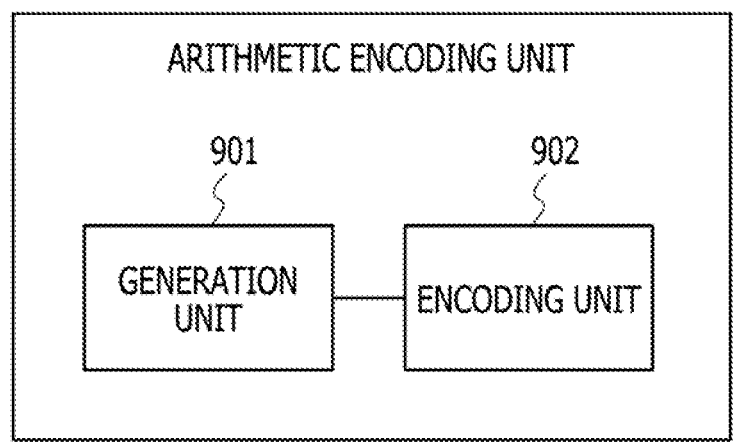
FIG. 9 is a functional configuration diagram of an arithmetic encoding unit.

FIG. 9 illustrates a functional configuration example of the arithmetic encoding unit 815 in FIG. 8. The arithmetic encoding unit 815 in FIG. 9 includes a generation unit 901 and an encoding unit 902. The generation unit 901 and the encoding unit 902 correspond to the generation unit 413 and the second encoding unit 414 in FIG. 4, respectively.

The generation unit 901 binarizes the prediction mode information output by the intra-frame prediction unit 817 and generates a bit string indicating the angle of intra prediction. Then, the generation unit 901 compares a partial bit value of the bit string with the bit value output by the estimation unit 825, thereby generating flag information indicating whether these bit values match each other. As the partial bit value of the bit string, a bit value of upper M bits (M is an integer of 1 or larger) of the bit string can be used.

The encoding unit 902 encodes the flag information generated by the generation unit 901 and the quantized coefficient output by the quantization unit 814 using a variable occurrence probability in a CABAC context mode. Then, the encoding unit 902 encodes a remaining bit value of the bit string generated by the generation unit 901 using a fixed occurrence probability in a CABAC bypass mode. The context mode corresponds to the first encoding method, and the bypass mode corresponds to the second encoding method.

Figure 10:
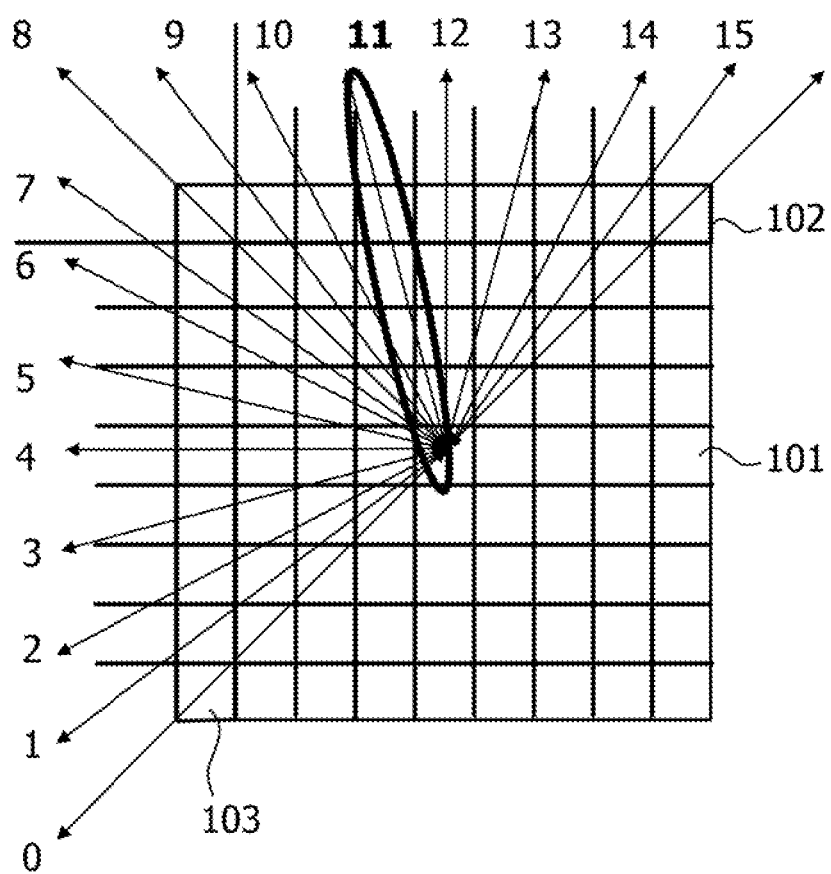
FIG. 10 is a diagram illustrating a selected angle.

FIG. 10 illustrates an example of the selected angle. In the example in FIG. 10, 0th to 15th sixteen angles out of seventeen angles illustrated in FIG. 2 are used as options. Among the options, in the case where the magnitude of the prediction error is minimized by using the 11th angle, the 11th angle is selected as the angle of intra prediction.

Figure 11B:
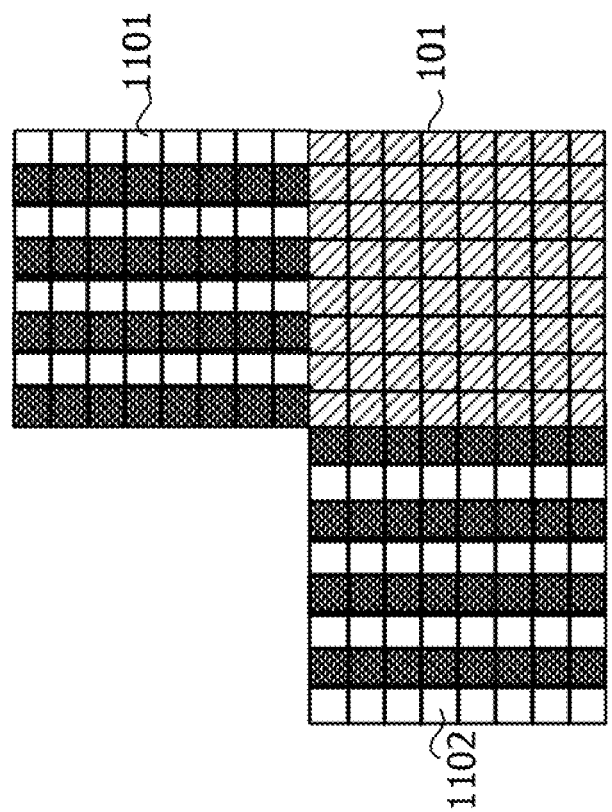
FIGS. 11A and 11B are diagrams illustrating a first estimation method.
Figure 11A:
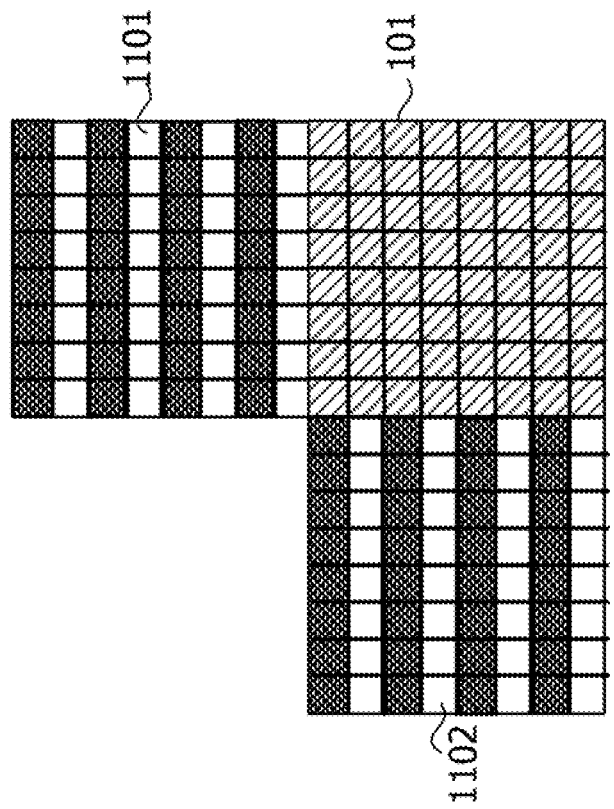

FIGS. 11A and 11B illustrate an example of a first estimation method for estimating the angle of intra prediction. The estimation unit 825 examines a pixel value distribution of adjacent blocks adjacent to the block to be encoded 101 and estimates an angle range to which the angle of intra prediction belongs from the pixel value distribution.

FIG. 11A illustrates an example in the case where the estimated angle range is a horizontal angle range. For example, the estimation unit 825 calculates an average value of each pixel in an edge direction from the pixel value distribution of an upper adjacent block 1101 and a left adjacent block 1102. Then, in the case where the angle indicated by the average value in the edge direction belongs to the horizontal angle range, the estimation unit 825 determines that there is a high possibility that the angle of intra prediction also belongs to the horizontal angle range.

FIG. 11B illustrates an example in the case where the estimated angle range is a vertical angle range. In the case where the angle indicated by the average value in the edge direction in the upper adjacent block 1101 and the left adjacent block 1102 belongs to a vertical angle range, the estimation unit 825 determines that there is a high possibility that the angle of intra prediction also belongs to the vertical angle range.

Figure 12:
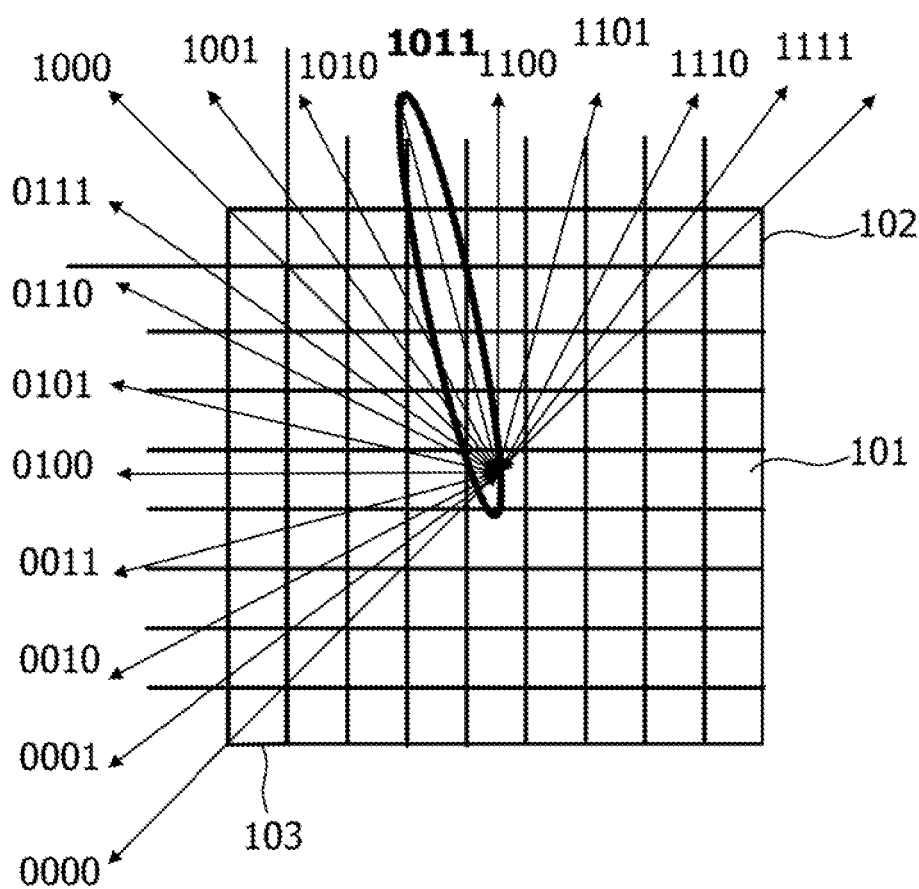
FIG. 12 is a diagram illustrating a bit string indicating an angle of intra prediction.

FIG. 12 illustrates examples of the bit string indicating the angle of intra prediction generated by the generation unit 901. The sixteen angles illustrated in FIG. 10 can be expressed using a 4-bit bit string. The bit value of the bit string indicating each angle is as follows.

0th angle: 0000
1st angle: 0001
2nd angle: 0010
3rd angle: 0011
4th angle: 0100
5th angle: 0101
6th angle: 0110
7th angle: 0111
8th angle: 1000
9th angle: 1001
10th angle: 1010
11th angle: 1011
12th angle: 1100
13th angle: 1101
14th angle: 1110
15th angle: 1111

For example, in the case where a partial bit value of the bit string is the most significant bit (MSB), the estimation unit 825 estimates the MSB of the bit string and generates a bit value (estimated value) indicating an estimation result of the MSB.

In the example in FIG. 12, the 0th to 7th angles with MSB=0 belong to the horizontal angle range, and the 8th to 15th angles with MSB=1 belong to the vertical angle range. Therefore, the estimation unit 825 sets the estimated value of the MSB to "0" in the case of determining that the angle of intra prediction belongs to the horizontal angle range, and sets the estimated value of the MSB to "1" in the case of determining that the angle of intra prediction belongs to the vertical angle range.

Then, the generation unit 901 calculates an exclusive OR (XOR) of the MSB of the bit string indicating the angle of intra prediction and the estimated value of the MSB, and outputs a value of the XOR to the encoding unit 902 as flag information. Furthermore, the generation unit 901 outputs a bit value other than the MSB of the bit string indicating the angle of intra prediction to the encoding unit 902 as a remaining bit value. In this case, the flag information indicates whether the MSB of the bit string matches the estimated value.

For example, in the case where the angle of intra prediction is the 11th angle, the XOR of "1" that is the MSB of the bit string "1011" and the estimated value of the MSB is output as the flag information, and the bit string "011" excluding the MSB is output as the remaining bit value.

As described above, the flag information does not directly indicate the angle of intra prediction but indicates the difference between the partial bit value of the bit string indicating the angle of intra prediction and the estimated value. Therefore, it is possible to make the occurrence probability of the value "0" indicating that the two bit values are the same higher than the occurrence probability of the value "1" indicating that the two bit values are different. Therefore, the flag information can be encoded in the context mode of CABAC, and the code amount of the prediction mode information indicating the angle of intra prediction is reduced.

Figure 13:
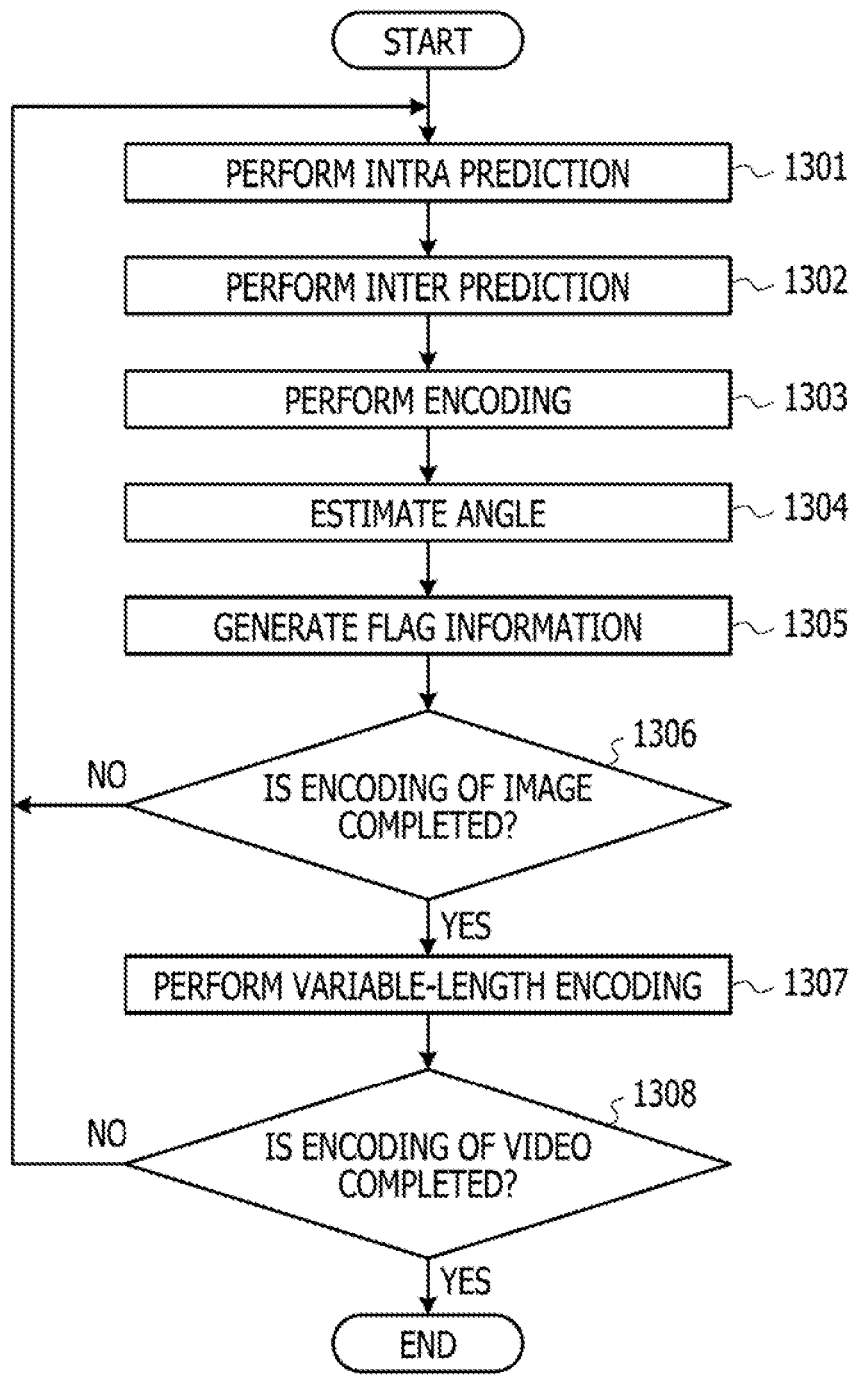
FIG. 13 is a flowchart illustrating a specific example of the video encoding processing.

FIG. 13 is a flowchart illustrating a specific example of the video encoding processing performed by the video encoding device 801 in FIG. 8. First, the intra-frame prediction unit 817 performs intra prediction for the block to be encoded (step 1301), and the inter-frame prediction unit 818 performs inter prediction for the block to be encoded (step 1302).

Next, the prediction error generation unit 812, the orthogonal transform unit 813, and the quantization unit 814 encode the block to be encoded using the predicted image output by either the intra-frame prediction unit 817 or the inter-frame prediction unit 818 to generate the quantized coefficient (step 1303). Then, the estimation unit 825 estimates the angle of intra prediction (step 1304) and the generation unit 901 of the arithmetic encoding unit 815 generates the flag information for the estimation result (step 1305).

Next, the video encoding device 801 determines whether encoding of the image to be encoded has been completed (step 1306). In the case where an unprocessed block remains (step 1306, NO), the video encoding device 801 repeats the processing in step 1301 and subsequent steps for the next block.

On the other hand, in the case where the encoding of the image to be encoded has been completed (step 1306, YES), the encoding unit 902 of the arithmetic encoding unit 815 performs variable-length encoding for the quantized coefficient and the prediction mode information (step 1307). The prediction mode information includes the remaining bit value of the bit string indicating the angle of intra prediction and the flag information.

Next, the video encoding device 801 determines whether encoding of the video to be encoded has been completed (step 1308). In the case where an unprocessed image remains (step 1308, NO), the video encoding device 801 repeats the processing in step 1301 and subsequent steps for the next image. Then, in the case where the encoding of the video to be encoded has been completed (step 1308, YES), the video encoding device 801 terminates the processing.

Figure 14:
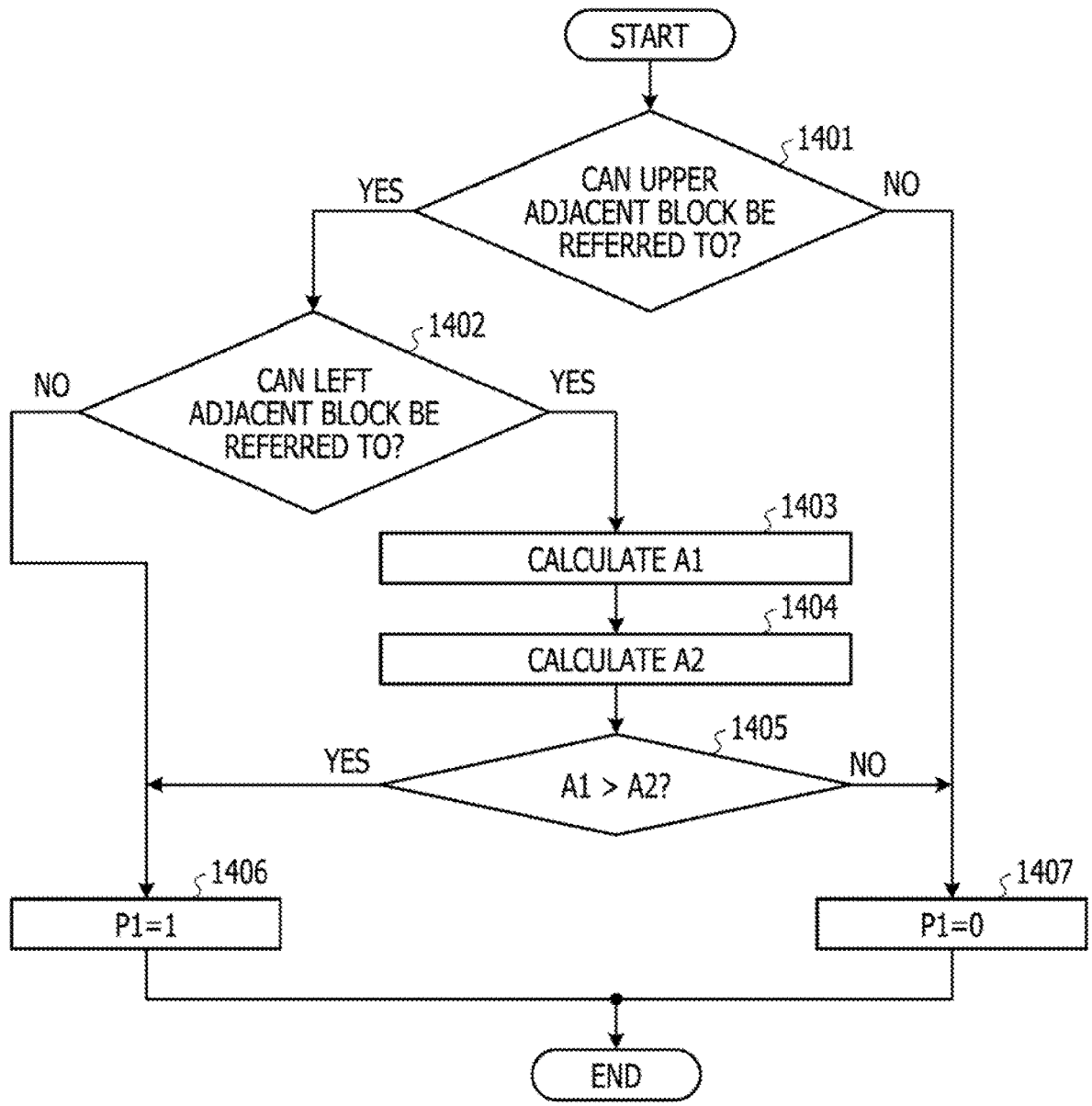
FIG. 14 is a flowchart of first estimation processing.

FIG. 14 is a flowchart illustrating an example of first estimation processing in step 1304 in FIG. 13. In the estimation processing in FIG. 14, the bit value of the MSB of the bit string is estimated.

First, the estimation unit 825 checks whether the upper adjacent block is referable in intra prediction for the block to be encoded (step 1401). For example, in the case where the block to be encoded is in contact with an upper end of an image, a slice, or a tile, it is determined that the upper adjacent block is not referable.

In the case where the upper adjacent block is referable (step 1401, YES), the estimation unit 825 checks whether the left adjacent block is referable in intra prediction for the block to be encoded (step 1402). For example, in the case where the block to be encoded is in contact with a left end of an image, a slice, or a tile, it is determined that the left adjacent block is not referable.

In the case where the left adjacent block is referable (step 1402, YES), the estimation unit 825 calculates an index A1 indicating the magnitude of a change in a locally decoded pixel value of an upper adjacent pixel in the upper adjacent block (step 1403). Next, the estimation unit 825 calculates an index A2 indicating the magnitude of a change in a locally decoded pixel value of a left adjacent pixel in the left adjacent block (step 1404) and compares the index A1 with the index A2 (step 1405).

In the case where the index A1 is larger than the index A2 (step 1405, YES), the estimation unit 825 sets an estimated value P1 of the MSB to "1" (step 1406). Meanwhile, in the case where the index A1 is equal to or smaller than the index A2 (step 1405, NO), the estimation unit 825 sets the estimated value P1 to "0" (step 1407).

In the case where the upper adjacent block is not referable (step 1401, NO), the estimation unit 825 sets the estimated value P1 to "0" (step 1407). Furthermore, In the case where the left adjacent block is not referable (step 1402, NO), the estimation unit 825 sets the estimated value P1 to "1" (step 1406).

As the index A1, a weighted sum of frequency coefficients obtained by converting the locally decoded pixel value of the upper adjacent pixel into a frequency domain can be used. In this case, the index A1 is calculated by the following expression, for example.

[Math. 1]

$$A1 = \sum_{i=0}^{n-1} \frac{dct1(i) * w(i)}{2^D} \quad (1)$$

In the expression (1), n represents a width of the block to be encoded and D represents a bit depth of the image. dct1(i) represents an i-th transform coefficient among n transform coefficients obtained by applying one-dimensional discrete cosine transform (DCT) to the locally decoded pixel values of n upper adjacent pixels. A spatial frequency of the component represented by the transform coefficient increases as i increases. w(i) represents a predetermined weight for the i-th transform coefficient and satisfies the following constraint.

[Math. 2]

$$\sum_{i=0}^{n-1} w(i) = 1 \quad (2)$$

The index A1 increases as a high-frequency component in the n upper adjacent pixels increase. Therefore, the larger the index A1, the higher the possibility that the edge direction of the upper adjacent pixel is the vertical direction.

Meanwhile, as the index A2, a weighted sum of frequency coefficients obtained by converting the locally decoded pixel value of the left adjacent pixel into a frequency domain can be used. In this case, the index A2 is calculated by the following expression, for example.

[Math. 3]

$$A2 = \sum_{i=0}^{m-1} \frac{dct2(i) * w(i)}{2^D} \quad (3)$$

In the expression (3), m represents the height of the block to be encoded, dct2(i) represents an i-th transform coefficient among m transform coefficients obtained by applying one-dimensional DCT to the locally decoded pixel values of m left adjacent pixels. w(i) represents a predetermined weight for the i-th transform coefficient and satisfies the following constraint.

[Math. 4]

$$\sum_{i=0}^{m-1} w(i) = 1 \quad (4)$$

The index A2 increases as a high-frequency component in the m left adjacent pixels increase. Therefore, the larger the index A2, the higher the possibility that the edge direction of e left adjacent pixel is the horizontal direction.

For example, in the case where n is a power of 2 and n≥8, the weight w(i) in the expression (1) can be defined by the following expressions.

[Math. 5]

$$w(i) = \left(\frac{1}{2}\right)^{floor\left(\frac{8*(n-1-i)}{n}\right)+1}, \quad n/8 \le i < n \quad (5)$$

[Math. 6]

$$w(i) = \left(\frac{1}{2}\right)^{floor\left(\frac{8*(n-1-i)}{n}\right)}, \quad 0 \le i < n/8 \quad (6)$$

floor(p) in expressions (5) and (6) represents a largest integer equal to or less than a real number p. In this case, w(i) is a reciprocal of a power of 2, and w(i)<w(i+1). Therefore, w(i) increases as i increases, and the weight can be increased as the spatial frequency increases.

FIGS. 15A and 15B illustrate examples of the weight w(i). FIG. 15A illustrates an example of the weight w(i) calculated by the expressions (5) and (6) in the case of n=8. FIG. 15B illustrates an example of the weight w(i) in the case of n=4. The weight w(i) in the expression (3) can be similarly defined to the weight w(i) in the expression (1).

According to the estimation processing in FIG. 14, the estimated value that is highly likely to match the bit value of the MSB of the bit string indicating the angle of intra prediction with a smaller arithmetic amount than the intra prediction in the intra-frame prediction unit 817. Thereby, the occurrence probability of the value "0" in the flag information can be made higher than the occurrence probability of the value "1".

Figure 16:
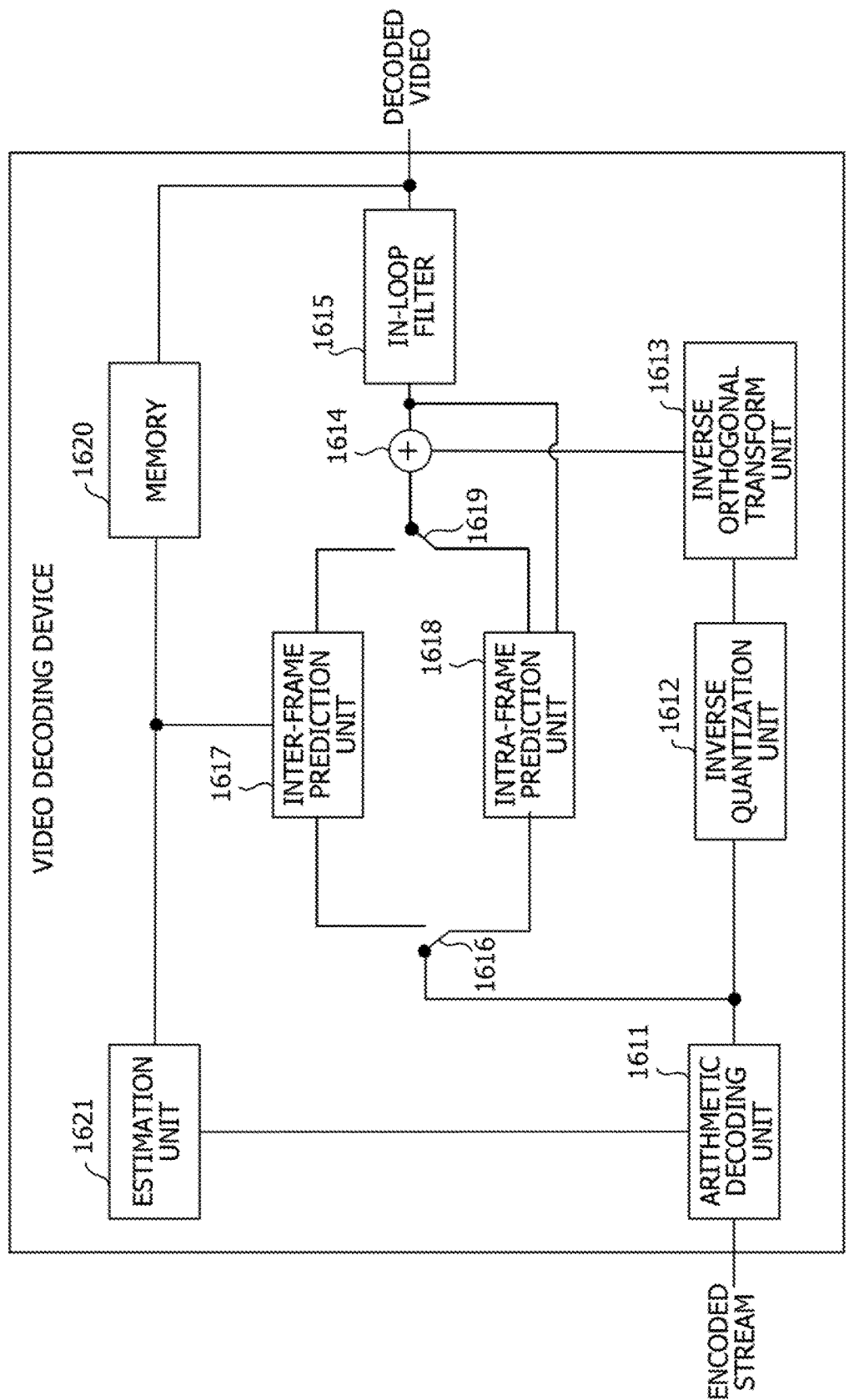
FIG. 16 is a functional configuration diagram illustrating a specific example of the video decoding device.

FIG. 16 illustrates a specific example of the video decoding device 601 in FIG. 6. A video decoding device 1601 in FIG. 16 includes an arithmetic decoding unit 1611, an inverse quantization unit 1612, an inverse orthogonal transform unit 1613, a reconstruction unit 1614, and an in-loop filter 1615. Moreover, the video decoding device 1601 includes a selection unit 1616, an inter-frame prediction unit 1617, an intra-frame prediction unit 1618, a selection unit 1619, a memory 1620, and an estimation unit 1621.

The estimation unit 1621 corresponds to the estimation unit 612 in FIG. 6. The inverse quantization unit 1612, the inverse orthogonal transform unit 1613, the reconstruction unit 1614, the in-loop filter 1615, the selection unit 1616, the inter-frame prediction unit 1617, the intra-frame prediction unit 1618, and the selection unit 1619 correspond to the second decoding unit 614 in FIG. 6.

The video decoding device 1601 can be implemented as, for example, a hardware circuit. In this case, each constituent element of the video decoding device 1601 may be implemented as an individual circuit or may be implemented as one integrated circuit.

The video decoding device 1601 decodes an input encoded stream and outputs a decoded video. The video decoding device 1601 can receive the encoded stream from the video encoding device 801 in FIG. 8 via a communication network.

The arithmetic decoding unit 1611 decodes the encoded stream according to a decoding method of CABAC, outputs a quantized coefficient of a block to be decoded in an image to be decoded to the inverse quantization unit 1612, and outputs prediction mode information for the block to be decoded to the selection unit 1616.

The inverse quantization unit 1612 performs inverse quantization for the quantized coefficient output by the arithmetic decoding unit 1611 to generate an inversely quantized coefficient, and outputs the generated inversely quantized coefficient to the inverse orthogonal transform unit 1613. The inverse orthogonal transform unit 1613 performs inverse orthogonal transform for the inversely quantized coefficient to generate a prediction error, and outputs the generated prediction error to the reconstruction unit 1614.

The selection unit 1616 outputs the prediction mode information of inter prediction to the inter-frame prediction unit 1617, and outputs the prediction mode information of intra prediction to the intra-frame prediction unit 1618.

The inter-frame prediction unit 1617 performs inter prediction for the block to be decoded using the prediction mode information of inter prediction and a reference image output by the memory 1620, generates a predicted image of inter prediction, and outputs the generated predicted image to the selection unit 1619.

The intra-frame prediction unit 1618 performs intra prediction for the block to be decoded using the prediction mode information of intra prediction and a decoded image of a decoded block output by the memory 1620, generates a predicted image of intra prediction, and outputs the generated predicted image to the selection unit 1619.

The selection unit 1619 selects the predicted image output by either the inter-frame prediction unit 1617 or the intra-frame prediction unit 1618, and outputs the selected predicted image to the reconstruction unit 1614.

The reconstruction unit 1614 adds the predicted image output by the selection unit 1619 and the prediction error output by the inverse orthogonal transform unit 1613 to generate a reconstructed image, and outputs the generated reconstructed image to the in-loop filter 1615.

The in-loop filter 1615 performs filtering processing of a deblocking filter, a sample adaptive offset filter, and the like for the reconstructed image output by the reconstruction unit 1614 to generate a decoded image. Then, the in-loop filter 1615 outputs the decoded image for one frame as a decoded video and outputs the decoded image to the memory 1620.

The memory 1620 stores the decoded image output by the in-loop filter 1615. The decoded image stored in the memory 1620 is output to the inter-frame prediction unit 1617, the intra-frame prediction unit 1618, and the estimation unit 1621. The inter-frame prediction unit 1617 uses the decoded image as a reference image for a subsequent image, and the intra-frame prediction unit 1618 uses the decoded pixel value included in the decoded image as a reference pixel value for a subsequent block. The estimation unit 1621 uses the decoded pixel value included in the decoded image as the decoded pixel value of the decoded pixel.

The estimation unit 1621 performs estimation processing similar to the estimation unit 825 in FIG. 8 using the decoded pixel value of the decoded pixel adjacent to the block to be decoded to generate a bit value indicating an estimation result of the angle of intra prediction for the block to be decoded. Then, the estimation unit 1621 outputs the generated bit value to the arithmetic decoding unit 1611.

Figure 17:
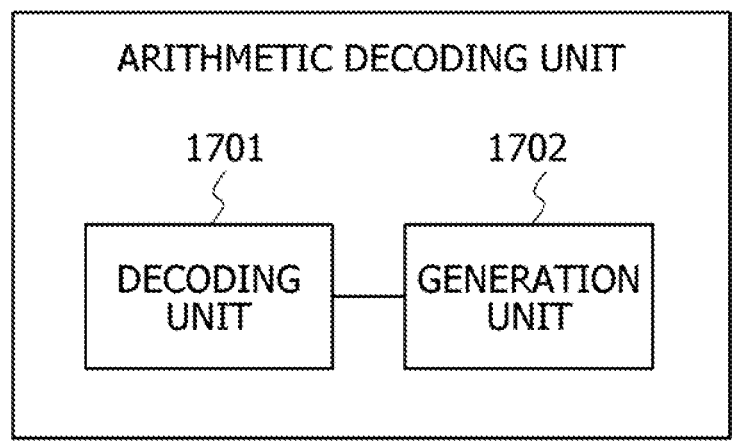
FIG. 17 is a functional configuration diagram of n arithmetic decoding unit.

FIG. 17 illustrates a functional configuration example of the arithmetic decoding unit 1611 in FIG. 16. The arithmetic decoding unit 1611 in FIG. 17 includes a decoding unit 1701 and a generation unit 1702. The decoding unit 1701 and the generation unit 1702 correspond to the first decoding unit 611 and the generation unit 613 in FIG. 6, respectively.

The decoding unit 1701 decodes an encoded stream using a variable occurrence probability in the context mode of CABAC to restore the quantized coefficient of the block to be decoded and the prediction mode information including the flag information for the angle of intra prediction. Moreover, the decoding unit 1701 decodes the encoded stream using a fixed occurrence probability in the bypass mode of CABAC to restore the prediction mode information including the remaining bit value of the bit string indicating the angle of intra prediction. The context mode corresponds to the first decoding method, and the bypass mode corresponds to the second decoding method.

Then, the decoding unit 1701 outputs the flag information and the remaining bit value of the bit string to the generation unit 1702. The generation unit 1702 generates the partial bit value of the bit string indicating the angle of intra prediction from the bit value output by the estimation unit 1621 using the flag information. Then, the generation unit 1702 concatenates the partial bit value of the bit string and the remaining bit value of the bit string to generate the bit string indicating the angle of intra prediction.

For example, in the case where the partial bit value of the bit string is the MSB, the estimation unit 1621 estimates the MSB of the bit string and generates an estimated value of the MSB. Next, the generation unit 1702 calculates an XOR of the estimated value of the MSB and the bit value indicated by the flag information, and sets a value of the XOR as the MSB of the bit string indicating the angle of intra prediction. Then, the generation unit 1702 sets the remaining bit value output by the decoding unit 1701 as a bit other than the MSB of the bit string indicating the angle of intra prediction.

For example, in the case where the angle of intra prediction is the 11th angle, the XOR of the estimated value of the MSB and the bit value indicated by the flag information is "1". Therefore, "1" is set as the MSB and is concatenated with the remaining bit value "011" to generate the bit string "1011" indicating the 11th angle. As described above, the entire bit string is restored from the estimated value of the MSB, the flag information, and the remaining bit value, and the angle of intra prediction can be obtained.

Figure 18:
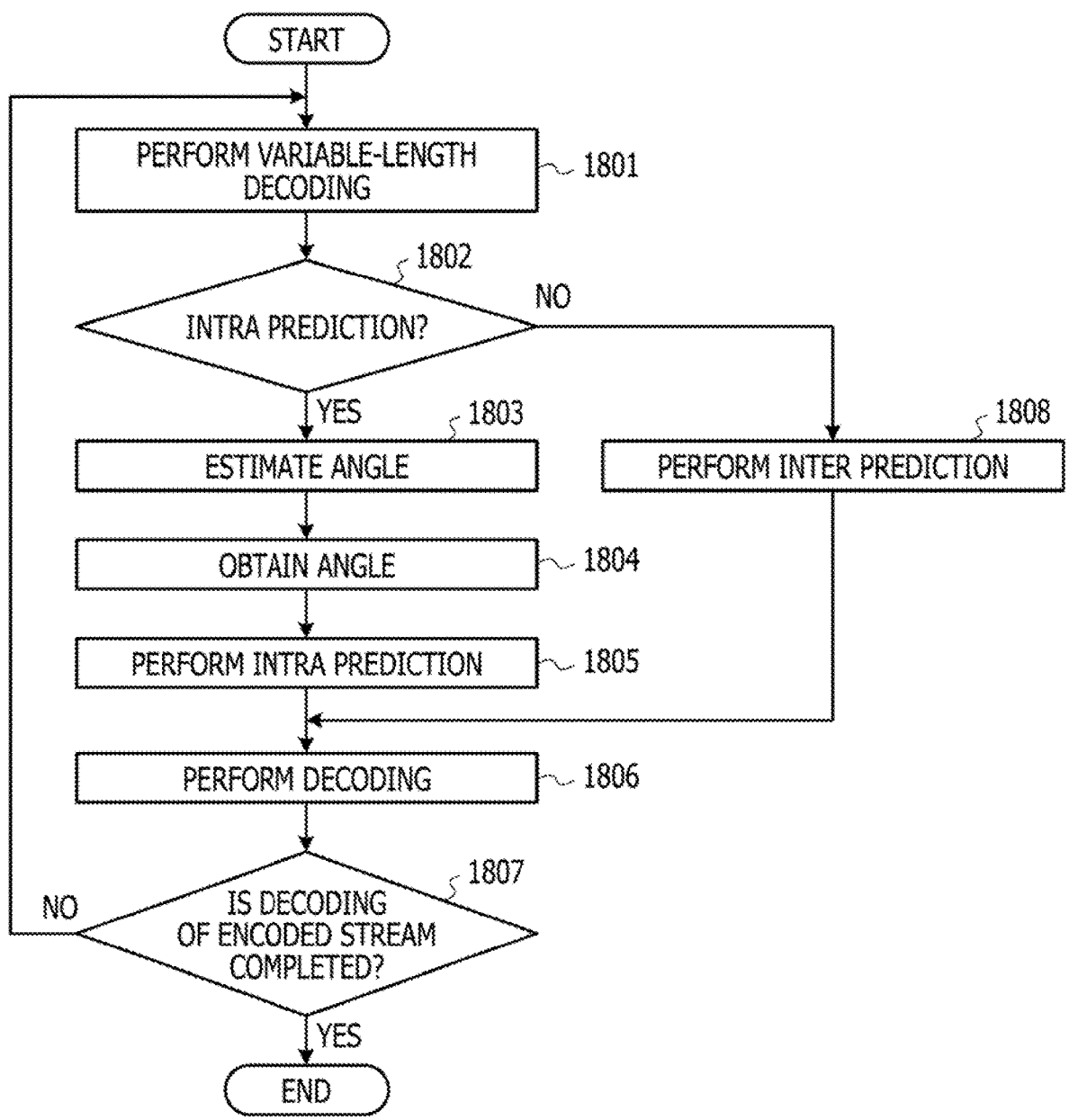
FIG. 18 is a flowchart illustrating a specific example of the video decoding processing.

FIG. 18 is a flowchart illustrating a specific example of the video decoding processing performed by the video decoding device 1601 in FIG. 16. First, the arithmetic decoding unit 1611 performs variable-length decoding for the encoded stream to generate the quantized coefficient and the prediction mode information of the block to be decoded (step 1801).

Next, the arithmetic decoding unit 1611 checks whether the prediction mode information of the block to be decoded indicates inter prediction or intra prediction (step 1802). The prediction mode information of intra prediction includes the remaining bit value of the bit string indicating the angle of intra prediction and the flag information.

In the case where the prediction mode information indicates intra prediction (step 1802, YES), the estimation unit 1621 estimates the angle of intra prediction (step 1803). Next, the arithmetic decoding unit 1611 obtains the angle of intra prediction using the estimation result, the flag information, and the remaining bit values (step 1804). Then, the intra-frame prediction unit 1618 performs intra prediction for the block to be decoded using the angle of intra prediction (step 1805).

Meanwhile, in the case where the prediction mode information indicates inter prediction (step 1802, NO), the inter-frame prediction unit 1617 performs inter prediction for the block to be decoded using the prediction mode information (step 1808).

Next, the inverse quantization unit 1612 and the inverse orthogonal transform unit 1613 decode the quantized coefficient of the block to be decoded to generate a prediction error (step 1806). Then, the selection unit 1619, the reconstruction unit 1614, and the in-loop filter 1615 generate the decoded image from the prediction error using the predicted image output by either the inter-frame prediction unit 1617 or the intra-frame prediction unit 1618.

Next, the video decoding device 1601 determines whether decoding of the encoded stream has been completed (step 1807). In the case where an unprocessed encoded string remains (step 1807, NO), the video decoding device 1601 repeats the processing in step 1801 and the subsequent steps for the next encoded string. Then, in the case where decoding of the encoded stream has been completed (step 1807, YES), the video decoding device 1601 terminates the processing.

Next, the video encoding processing and the video decoding processing in the case where a partial bit value of a bit string is upper two bits will be described with reference to FIG. 19A to FIG. 22. In this case, the estimation unit 825 of the video encoding device 801 estimates upper two bits of a bit string, and generates a bit value (estimated value) indicating an estimation result of a two-bit bit string.

Figure 19A:
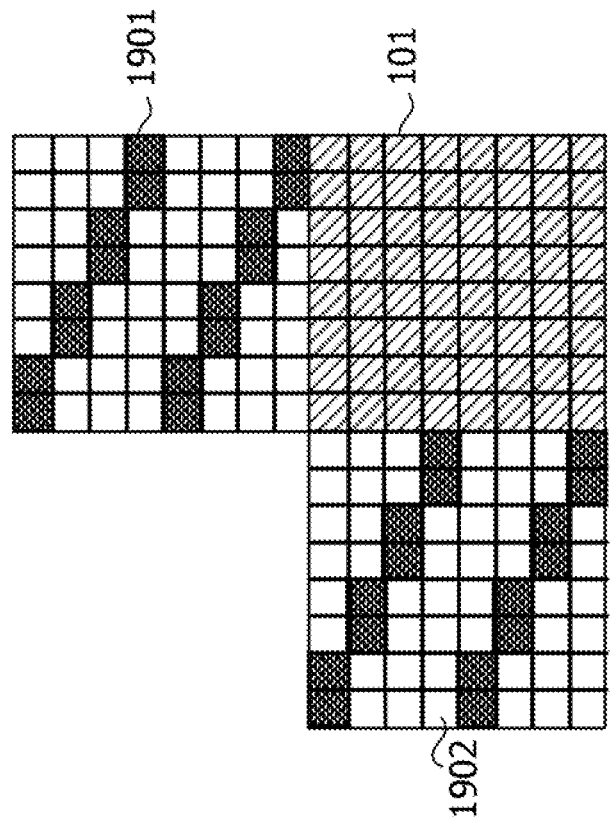
FIGS. 19A and 19B are diagrams illustrating a second estimation method.
Figure 19B:
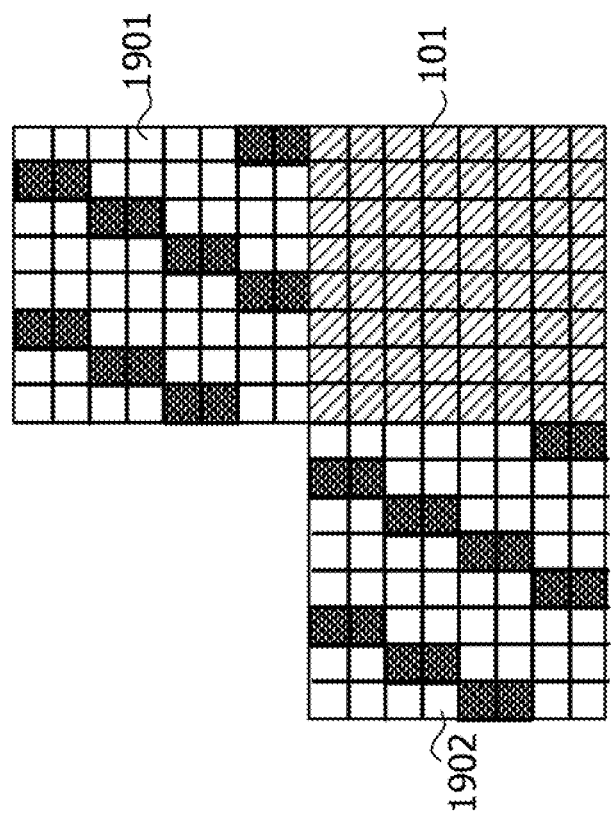

FIGS. 19A and 19B illustrate an example of a second estimation method for estimating the angle of intra prediction. The estimation unit 825 examines a pixel value distribution of adjacent blocks adjacent to the block to be encoded 101 and estimates an angle range to which the angle of intra prediction belongs from the pixel value distribution, similarly to the estimation method in FIGS. 11A and 11B.

FIG. 19A illustrates an example in the case where the estimated angle range is a horizontal angle range. For example, the estimation unit 825 calculates an average value of each pixel in the edge direction from the pixel value distribution of an upper adjacent block 1901 and a left adjacent block 1902. Then, in the case where the angle indicated by the average value in the edge direction belongs to the horizontal angle range, the estimation unit 825 determines that there is a high possibility that the angle of intra prediction also belongs to the horizontal angle range.

FIG. 19B illustrates an example in the case where the estimated angle range is a vertical angle range. In the case where the angle indicated by the average value in the edge direction in the upper adjacent block 1901 and the left adjacent block 1902 belongs to a vertical angle range, the estimation unit 825 determines that there is a high possibility that the angle of intra prediction also belongs to the vertical angle range.

In the case of using the upper two-bit estimated value, the horizontal angle range can be divided into two angle ranges and the vertical angle range can be divided into two angle ranges to generate four angle ranges.

In the example illustrated in FIG. 12, the 0th to 3rd angles in which the upper two bits are "00" belong to a horizontal angle range G1, and the 4th to 7th angles in which the upper two bits are "01" belongs to a horizontal angle range G2. Furthermore, the 8th to 11th angles in which the upper two bits are "10" belong to a vertical angle range G3, and the 12th to 15th angles in which the upper two bits are "11" belong to a vertical angle ranges G4.

In the angle range G1, the arrows indicating the angles point to lower left directions. In the angle range G2 and the angle range G3, the arrows indicating the angles point to upper left directions. In the angle range G4, the arrows indicating the angles point to upper right directions.

The estimation unit 825 sets the upper two-bit estimated value to "00" in the case of determining that the angle of intra prediction belongs to the angle range G1, and sets the upper two-bit estimated value to "01" in the case of determining that the angle of intra prediction belongs to the angle range G2. Furthermore, the estimation unit 825 sets the upper two-bit estimated value to "10" in the case of determining that the angle of intra prediction belongs to the angle range G3, and sets the upper two-bit estimated value to "11" in the case of determining that the angle of intra prediction belongs to the angle range G4.

Then, the generation unit 901 calculates an XOR of the upper two bits of the bit string indicating the angle of intra prediction and the upper two-bit estimated value, and outputs a value of the XOR to the encoding unit 902 as the flag information. Furthermore, the generation unit 901 outputs a bit value other than the upper two bits of the bit string indicating the angle of intra prediction to the encoding unit 902 as the remaining bit value.

In this case, the flag information includes a first flag and a second flag. The first flag indicates whether a first-bit (MSB) bit value of the upper two bits matches a first-bit bit value of the upper two-bit estimated value. Meanwhile, the second flag indicates whether a second-bit bit value of the upper two bits matches a second-bit bit value of the upper two-bit estimated value.

For example, in the case where the angle of intra prediction is the 11th angle, the XOR of each bit value of "10" that is the upper two bits of the bit string "1011" and each bit value of the upper two-bit estimated value is output as the flag information. Then, the bit string "11" excluding the upper two bits is output as the remaining bit value.

As described above, by using the upper two-bit estimated value of the bit string indicating the angle of intra prediction, the bit number of the remaining bit value is reduced as compared with the case of using an estimated value of only the MSB. Therefore, the bit number encoded in the bypass mode of CABAC can be reduced, and the code amount of the prediction mode information indicating the angle of intra prediction may be further reduced.

In step 1304 in FIG. 13, the estimation unit 825 can estimate the first-bit bit value of the upper two bits by the estimation processing in FIG. 14.

Figure 20:
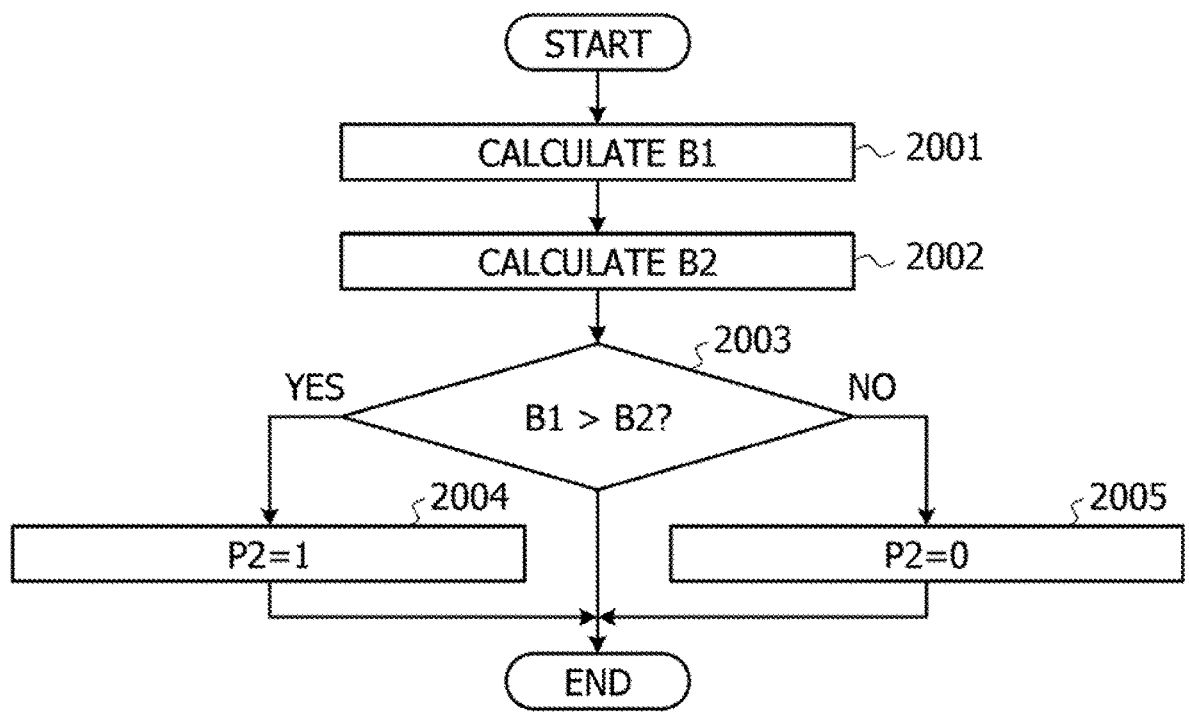
FIG. 20 is a flowchart of second estimation processing.

FIG. 20 is a flowchart illustrating an example of second estimation processing for estimating the second-bit bit value of upper two bits in the case where the upper adjacent block and the left adjacent block is referable in step 1304 in FIG. 13.

First, the estimation unit 825 calculates an index B1 indicating the magnitude of a change in a locally decoded pixel value in an oblique direction V1 from locally decoded pixel values of encoded pixels of two lines in an upper adjacent block or a left adjacent block (step 2001). Next, the estimation unit 825 calculates an index B2 indicating the magnitude of a change in a locally decoded pixel value in an oblique direction V2 intersecting with the oblique direction V1 from the locally decoded pixel values of the encoded pixels of the two lines (step 2002) and compares the index B1 with the index B2 (step 2003).

In the case where the index B1 is larger than the index B2 (step 2003, YES), the estimation unit 825 sets a second-bit estimated value P2 to "1" (step 2004). Meanwhile, in the case where the index B1 is equal to or smaller than the index B2 (step 2003, NO), the estimation unit 825 sets the estimated value P2 to "0" (step 2005).

As the index B1, a sum of absolute differences of locally decoded pixel values of pixels arranged in the oblique direction V1 among the pixels of two lines adjacent to the block to be encoded in the upper adjacent block or the left adjacent block can be used.

In the case where the first-bit estimated value is "0", that is, the estimated angle belongs to the angle range G1 or the angle range G2, pixels of right-end two lines in the left adjacent block are used. Meanwhile, in the case where the first-bit estimated value is "1", that is, the estimated angle belongs to the angle range G3 or the angle range G4, pixels of lower-end two lines in the upper adjacent block are used.

As the index B2, the sum of absolute differences of locally decoded pixel values of pixels arranged in the oblique direction V2 among the pixels of two lines used for calculating the index B1 can be used.

Figure 21:
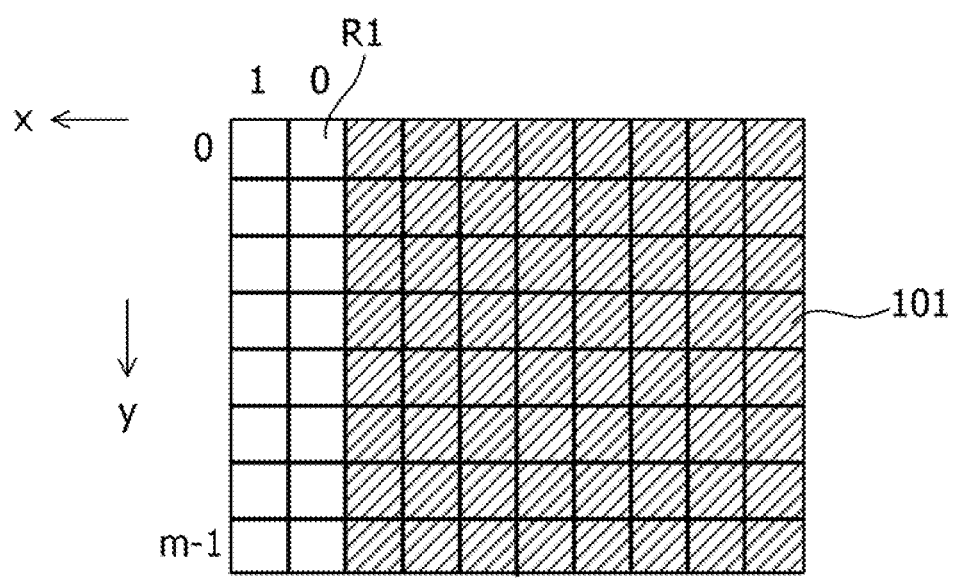
FIG. 21 is a diagram illustrating a method of calculating an index in a case where a first-bit estimated value is "0"

FIG. 21 illustrates an example of a method of calculating the index B1 and the index B2 in the case where the first-bit estimated value is "0". In this case, the index B1 is calculated by, for example, the following expression.

[Math. 7]

$$B1 = \sum_{i=0}^{m-1} \|ref(0, i) - ref(1, i+1)\| \quad (7)$$

In the expression (7), m represents the height of the block to be encoded, and ref(x, y) represents the locally decoded pixel value of the pixel present at a position (x, y) in the left adjacent block. x and y are relative coordinates with an upper right pixel R1 of the left adjacent block as a reference position (0, 0), where x increases leftward and y increases downward.

In this case, the sum of absolute differences is calculated between the pixel of the line of x=0 and the pixel of the line of x=1, and the oblique direction V1 corresponds to a direction from the upper right to the lower left. The index B1 becomes larger as the sum of absolute differences is larger. Therefore, the change in the locally decoded pixel value in the oblique direction V1 is larger as the index B1 is larger, and the edge direction of the pixels of the two lines are highly likely to be the direction intersecting with the oblique direction V1.

Meanwhile, the index B2 is calculated by, for example, the following expression.

[Math. 8]

$$B2 = \sum_{i=1}^{m} \|ref(0, i) - ref(1, i-1)\| \quad (8)$$

Even in this case, the sum of absolute differences calculated between the pixels in the line of x=0 and the pixel in the line of x=1. The oblique direction V2 corresponds to a direction from the lower right to the upper left, and is orthogonal to the oblique direction V1. The index B2 becomes larger as the sum of absolute differences is larger. Therefore, the change in the locally decoded pixel value in the oblique direction V2 is larger as the index B2 is larger, and the edge direction of the pixels of the two lines are highly likely to be the direction intersecting with the oblique direction V2.

Figure 22:
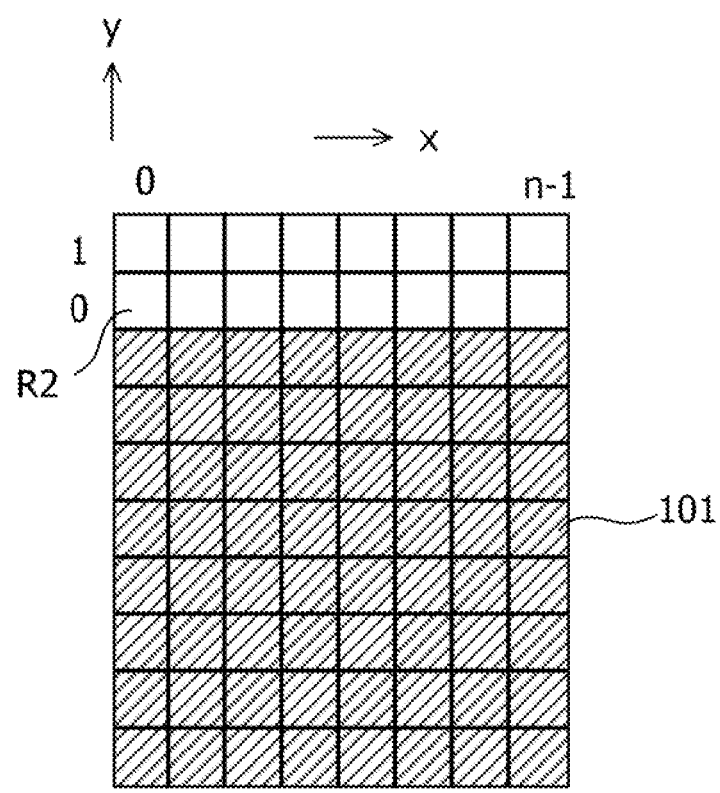
FIG. 22 is a diagram illustrating a method of calculating an index in a case where the first-bit estimated value is "1"

FIG. 22 illustrates an example of a method of calculating the index B1 and the index B2 in the case where the first-bit estimated value is "1". In this case, the index B1 is calculated by, for example, the following expression.

[Math. 9]

$$B1 = \sum_{i=1}^{n} \|ref(i, 0) - ref(i-1, 1)\| \quad (9)$$

In the expression (9), n represents the width of the block to be encoded, and ref (x, y) represents the locally decoded pixel value of the pixel present at the position (x, y) in the upper adjacent block. x and y are relative coordinates with a lower left pixel R2 of the upper adjacent block as the reference position (0, 0), where x increases rightward and y increases upward.

In this case, the sum of absolute differences is calculated between the pixel of the line of y=0 and the pixel of the line of y=1, and the oblique direction V1 corresponds to a direction from the lower right to the upper left. The change in the locally decoded pixel value in the oblique direction V1 is larger as the index B1 is larger, and the edge direction of the pixels of the two lines are highly likely to be the direction intersecting with the oblique direction V1.

Meanwhile, the index B2 is calculated by, for example, the following expression.

[Math. 10]

$$B2 = \sum_{i=0}^{n-1} \|ref(i, 0) - ref(i+1, 1)\| \quad (10)$$

Even in this case, the sum of absolute differences is calculated between the pixels in the line of y=0 and the pixel in the line of y=1. The oblique direction V2 corresponds to a direction from the lower left to the upper right, and is orthogonal to the oblique direction V1. The change in the locally decoded pixel value in the oblique direction V2 is larger as the index B2 is larger, and the edge direction of the pixels of the two lines are highly likely to be the direction intersecting with the oblique direction V2.

According to the estimation processing in FIGS. 14 and 20, the estimated value that is highly likely to match the upper two-bit bit value of the bit string indicating the angle of intra prediction with a smaller arithmetic amount than the intra prediction in the intra-frame prediction unit 817. Thereby, the occurrence probability of the value "0" in the first flag and the second flag can be made higher than the occurrence probability of the value "1".

The estimation unit 1621 of the video decoding device 1601 performs estimation processing similar to the estimation unit 825 to generate an upper two-bit estimated value. Then, the generation unit 1702 of the arithmetic decoding unit 1611 calculates an XOR of the upper two-bit estimated value and the two-bit bit value indicated by the flag information, and sets a value of the XOR as the upper two bits of the bit string indicating the angle of intra prediction. Then, the generation unit 1702 sets the remaining bit value output by the decoding unit 1701 as a bit other than the upper two bits of the bit string indicating the angle of intra prediction.

For example, in the case where the angle of intra prediction is the 11th angle, the XOR of the upper two-bit estimated value and the two-bit bit value indicated by the flag information is "10". Therefore, "10" is set as the upper two bits and is concatenated with the remaining bit value "11" to generate the bit string "1011" indicating the 11th angle.

Figure 23:
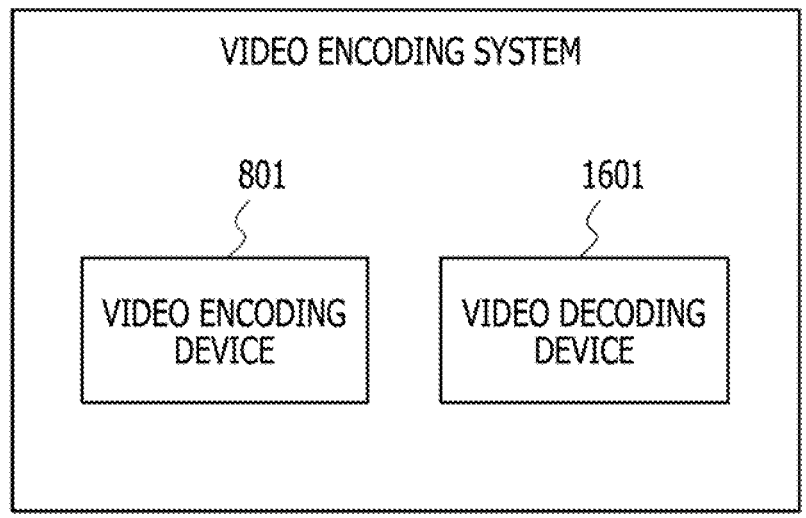
FIG. 23 is a functional configuration diagram of a video encoding system.

FIG. 23 illustrates a functional configuration example of a video encoding system. A video encoding system 2301 in FIG. 23 includes the video encoding device 801 in FIG. 8 and the video decoding device 1601 in FIG. 16 and is used for various uses. For example, the video encoding system 2301 may be a video camera, a video transmission device, a video reception device, a videophone system, a computer, or a mobile phone.

The configurations of the video encoding devices in FIGS. 4 and 8 are merely examples and some constituent elements may be omitted or modified depending on the use or conditions of the video encoding device. The configuration of the arithmetic encoding unit 815 in FIG. 9 is merely an example and some constituent elements may be omitted or modified depending on the use or conditions of the video encoding device. The video encoding device may adopt an encoding method other than HEVC or may adopt a variable-length encoding method other than CABAC.

The configurations of the video decoding devices in FIGS. 6 and 16 are merely examples and some constituent elements may be omitted or modified depending on the use or conditions of the video decoding device. The configuration of the arithmetic decoding unit 1611 in FIG. 17 is merely an example and some constituent elements may be omitted or modified depending on the use or conditions of the video decoding device. The video decoding device may adopt a decoding method other than HEVC or may adopt a variable-length decoding method other than CABAC.

The configuration of the video encoding system 2301 in FIG. 23 is merely an example and some constituent elements may be omitted or modified depending on the use or conditions of the video encoding system 2301.

The flowcharts illustrated in FIGS. 5, 7, 13, 14, 18, and 20 are merely examples, and some processing may be omitted or changed according to the configuration or conditions of the video encoding device or the video decoding device.

For example, in steps 1403 and 1404 in FIG. 14, another index indicating the magnitude of a change in the locally decoded pixel value may be used instead of the weighted sum of frequency coefficients. Furthermore, in steps 2001 and 2002 in FIG. 20, another index indicating the magnitude of a change in the locally decoded pixel value in the oblique direction may be used instead of the sum of absolute differences of the locally decoded pixel values. In step 1304 in FIG. 13 and step 1803 in FIG. 18, bit values of upper three bits or more of the bit string indicating the angle of intra prediction may be estimated.

The block to be encoded 101, the upper adjacent pixel 102, and the left adjacent pixel 103 illustrated in FIG. 1 are merely examples, and these blocks and pixels change according to the video to be encoded. The angles of intra prediction illustrated in FIGS. 2, 3, and 10 are merely examples, and the angles of intra prediction change according to the encoding method applied to the video to be encoded.

The upper adjacent block and the left adjacent block illustrated in FIGS. 11A and 11B and 19A and 11B are merely examples, and the edge directions of the upper adjacent block and the left adjacent block change according to the video to be encoded. The bit string indicating the angle of intra prediction illustrated in FIG. 12 is merely an example, and this bit string changes according to the number of angles of intra prediction.

The weights w(i) illustrated in FIGS. 15A and 15B are merely examples, and other values may be used as the weights w(i). The method of calculating the indices B1 and B2 illustrated in FIGS. 21 and 22 is merely an example, and the indices B1 and B2 may be calculated by another calculating method.

The expressions (1) to (10) are merely examples, and other calculation expressions may be used to estimate the partial bit value of the bit string indicating the angle of intra prediction.

Figure 24:
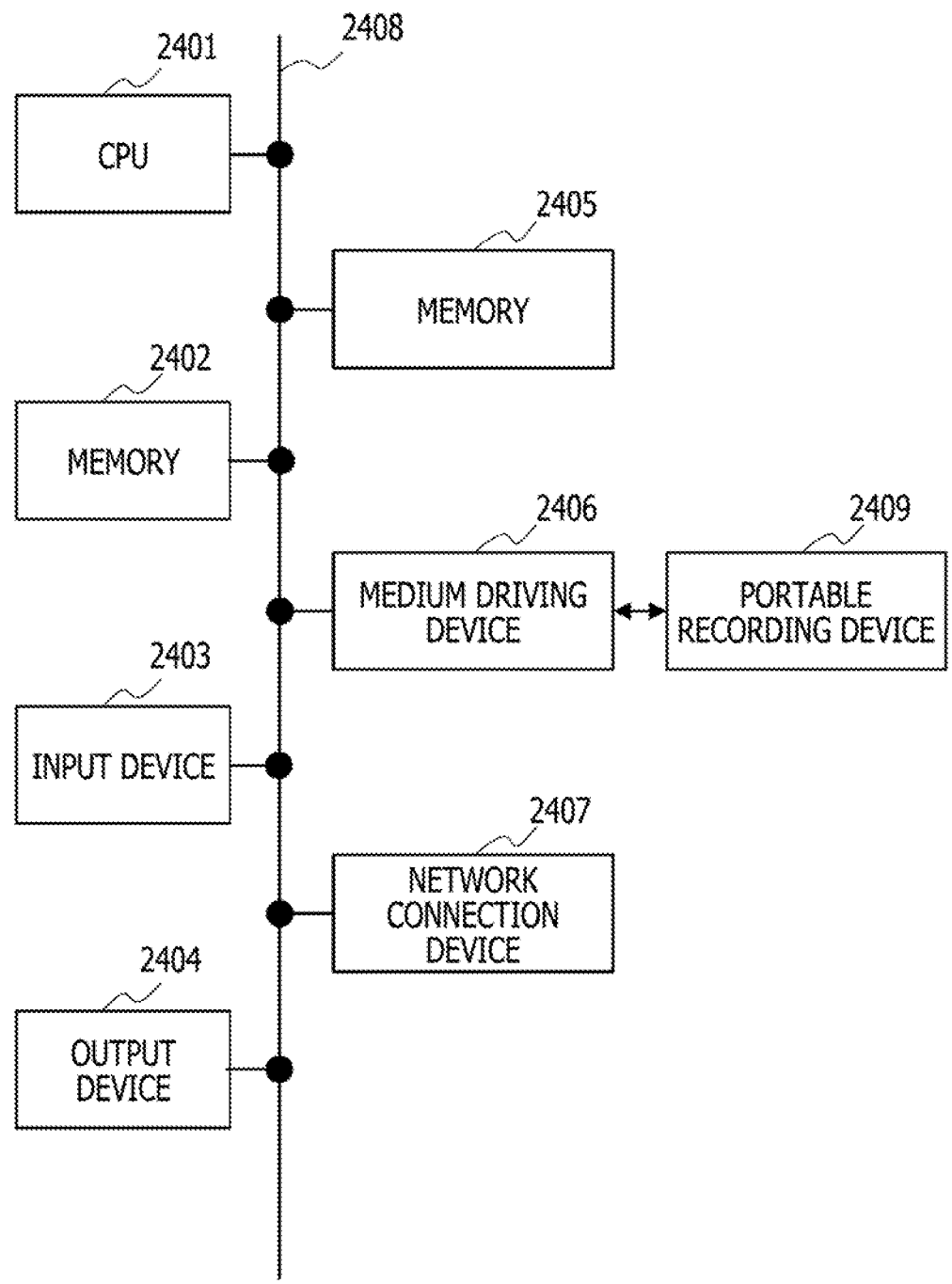
FIG. 24 is a configuration diagram of an information processing apparatus.

The video encoding device 401 in FIG. 4, the video decoding device 601 in FIG. 6, the video encoding device 801 in FIG. 8, and the video decoding device 1601 in FIG. 16 can be implemented as hardware circuits or can also be implemented using an information processing apparatus (computer) as illustrated in FIG. 24.

The information processing apparatus in FIG. 24 includes a central processing unit (CPU) 2401, a memory 2402, an input device 2403, an output device 2404, an auxiliary storage device 2405, a medium driving device 2406, and a network connection device 2407. These constituent elements are connected to one another by a bus 2408.

The memory 2402 is, for example, a semiconductor memory such as a read only memory (ROM), a random access memory (RAM), a flash memory, or the like and stores programs and data used for processes. The memory 2402 can be used as the memory 824 in FIG. 8 and the memory 1620 in FIG. 16.

The CPU 2401 (processor) operates as the first encoding unit 411, the estimation unit 412, the generation unit 413, and the second encoding unit 414 in FIG. 4 by executing a program using the memory 2402, for example.

The CPU 2401 also operates as the first decoding unit 611, the estimation unit 612, the generation unit 613, and the second decoding unit 614 in FIG. 6 by executing a program using the memory 2402.

The CPU 2401 also operates as the block division unit 811, the prediction error generation unit 812, the orthogonal transform unit 813, the quantization unit 814, the arithmetic encoding unit 815, and the encoding control unit 816 in FIG. 8 by executing a program using the memory 2402. The CPU 2401 also operates as the intra-frame prediction unit 817, the inter-frame prediction unit 818, the selection unit 819, the inverse quantization unit 820, the inverse orthogonal transform unit 821, the reconstruction unit 822, and the in-loop filter 823 by executing a program using the memory 2402. The CPU 2401 also operates as the estimation unit 825 by executing a program using the memory 2402.

The CPU 2401 also operates as the generation unit 901 and the encoding unit 902 in FIG. 9 by executing a program using the memory 2402.

The CPU 2401 also operates as the arithmetic decoding unit 1611, the inverse quantization unit 1612, the inverse orthogonal transform unit 1613, the reconstruction unit 1614, and the in-loop filter 1615 in FIG. 16 by executing a program using the memory 2402. The CPU 2401 operates as the selection unit 1616, the inter-frame prediction unit 1617, the intra-frame prediction unit 1618, the selection unit 1619, and the estimation unit 1621 by executing a program using the memory 2402.

The CPU 2401 also operates as the decoding unit 1701 and the generation unit 1702 in FIG. 17 by executing a program using the memory 2402.

The input device 2403 is, for example, a keyboard or a pointing device and is used for inputting instructions and information from a user or an operator. The output device 2404 is, for example, a display device, a printer, or a speaker and is used for making an inquiry to the user or the operator and outputting a processing result. The processing result may be a decoded video.

The auxiliary storage device 2405 is, for example, a magnetic disk device, an optical disk device, a magneto-optical disk device, a tape device, or the like. The auxiliary storage device 2405 may be a hard disk drive. The information processing apparatus can store programs and data in the auxiliary storage device 2405 and load these programs and data into the memory 2402 for use.

The medium driving device 2406 drives a portable recording medium 2409 and accesses recorded contents of the portable recording medium 2409. The portable recording medium 2409 is a memory device, a flexible disk, an optical disk, a magneto-optical disk, or the like. The portable recording medium 2409 may be a compact disk read only memory (CD-ROM), a digital versatile disk (DVD), or a universal serial bus (USB) memory. The user or the operator can save programs and data in this portable recording medium 2409 and load these programs and data into the memory 2402 to use.

As described above, a computer-readable recording medium in which the programs and data used for processes are saved includes a physical (non-transitory) recording medium such as the memory 2402, the auxiliary storage device 2405, and the portable recording medium 2409.

The network connection device 2407 is a communication interface circuit that is connected to a communication network such as a local area network (LAN) and the Internet and performs data conversion involved in communication. The network connection device 2407 can transmit the encoded stream to the video decoding device and can receive the encoded stream from the video encoding device. The information processing apparatus can receive programs and data from an external device via the network connection device 2407 and load these programs and data into the memory 2402 for use.

Note that, the information processing apparatus does not need to include all the constituent elements in FIG. 24, and some constituent elements may be omitted depending on the use or the condition. For example, when an interface with the user or the operator is not needed, the input device 2403 and the output device 2404 may be omitted. Furthermore, in the case where the information processing apparatus does not access the portable recording medium 2409, the medium driving device 2406 may be omitted.

While the disclosed embodiments and the advantages thereof have been described in detail, those skilled in the art will be able to make various modifications, additions, and omissions without departing from the scope of the embodiment as explicitly set forth in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention,

What is claimed is:

1. An information processing device comprising:
a memory; and
a processor coupled to the memory and configured to:
determine an angle of intra prediction for a block to be encoded in an image included in a video, and encode the block to be encoded using the angle of intra prediction;
generate a bit value indicating an estimation result of the angle using a locally decoded pixel value of an encoded pixel adjacent to the block to be encoded;
generate a bit string indicating the angle of intra prediction;
generate flag information indicating whether a value of a partial bit of the bit string matches the bit value indicating the estimation result of the angle by extracting the partial bit from the bit string and performing a specific operation on the value of the partial bit;

encode the flag information corresponding to the partial bit by a first encoding method using a variable occurrence probability in context-adaptive binary arithmetic coding; and encode one or more values of one or more remaining bits obtained by excluding the partial bit from the bit string by a second encoding method using a fixed occurrence probability in the context-adaptive binary arithmetic coding.

2. The information processing device according to claim 1, wherein the value of the partial bit of the bit string is a bit value of a most significant bit of the bit string, and the bit value of the most significant bit indicates which of two angle ranges in the intra prediction the angle of intra prediction belongs to, and the flag information indicates whether the bit value of the most significant bit matches the bit value indicating the estimation result of the angle.

3. The information processing device according to claim 2, wherein the processor generates the bit value indicating the estimation result of the angle by calculating a first index indicating magnitude of a change in a locally decoded pixel value of an encoded pixel adjacent to a side in a horizontal direction of the block to be encoded in the image, calculating a second index indicating magnitude of a change in a locally decoded pixel value of an encoded pixel adjacent to a side in a vertical direction of the block to be encoded in the image, and comparing the first index with the second index.

4. The information processing device according to claim 1, wherein the value of the partial bit of the bit string is an upper two-bit bit value of the bit string, and the upper two-bit bit value indicates which of four angle ranges in the intra prediction the angle of intra prediction belongs to, the bit value indicating the estimation result of the angle is a bit value of a two-bit bit string, and the flag information includes a first flag indicating whether a first-bit bit value of the upper two bits matches a first-bit bit value of the two-bit bit string, and a second flag indicating whether a second-bit bit value of the upper two bits matches a second-bit bit value of the two-bit bit string.

5. The information processing device according to claim 4, wherein the processor generates the first-bit bit value of the two-bit bit string by calculating a first index indicating magnitude of a change in a locally decoded pixel value of an encoded pixel adjacent to a side in a horizontal direction of the block to be encoded in the image, calculating a second index indicating magnitude of a change in a locally decoded pixel value of an encoded pixel adjacent to a side in a vertical direction of the block to be encoded in the image, and comparing the first index with the second index, and generates the second-bit bit value of the two-bit bit string by calculating a third index indicating magnitude of a change in a locally decoded pixel value in an oblique direction from locally decoded pixel values of encoded pixels of two lines adjacent to a side in a horizontal direction or a vertical direction of the block to be encoded in the image, calculating a fourth index indicating magnitude of a change in a locally decoded pixel value in an oblique direction intersecting with the oblique direction from the locally decoded pixel values of encoded pixels of two lines, and comparing the third index with the fourth index.

6. A video encoding method comprising:
by a video encoding device, determining an angle of intra prediction for a block to be encoded in an image included in a video;
encoding the block to be encoded using the angle of intra prediction;
generating a bit value indicating an estimation result of the angle using a locally decoded pixel value of an encoded pixel adjacent to the block to be encoded;
generating a bit string indicating the angle of intra prediction;
generating flag information indicating whether a value of a partial bit of the bit string matches the bit value indicating the estimation result of the angle by extracting the partial bit from the bit string and performing a specific operation on the value of the partial bit;
encoding the flag information corresponding to the partial bit by a first encoding method using a variable occurrence probability in context-adaptive binary arithmetic coding; and
encoding one or more values of one or more remaining bits obtained by excluding the partial bit from the bit string by a second encoding method using a fixed occurrence probability in the context-adaptive binary arithmetic coding.

7. An information processing device comprising:
a memory; and
a processor coupled to the memory and configured to:
    acquire an encoded video which is generated by:
        determining an angle of intra prediction for a block to be encoded in an image included in a video;
        encoding the block to be encoded using the angle of intra prediction;
        generating a bit value indicating an estimation result of the angle using a locally decoded pixel value of an encoded pixel adjacent to the block to be encoded;
        generating a bit string indicating the angle of intra prediction;
        generating flag information indicating whether a value of a partial bit of the bit string matches the bit value indicating the estimation result of the angle by extracting the partial bit from the bit string and performing a specific operation on the value of the partial bit;
        encoding the flag information corresponding to the partial bit by a first encoding method using a variable occurrence probability in context-adaptive binary arithmetic coding; and
        encoding one or more values of one or more remaining bits obtained by excluding the partial bit from the bit string by a second encoding method using a fixed occurrence probability in the context-adaptive binary arithmetic coding;
    decode the encoded video by a first decoding method corresponding to the first encoding method to restore the flag information;
    decode the encoded video by a second decoding method corresponding to the second encoding method to restore the remaining bit value of the bit string;
    generate the bit value using a decoded pixel value of a decoded pixel adjacent to a block to be decoded;
    generate the value of the partial bit of the bit string from the bit value on a basis of the flag information;
    obtain the angle of the intra prediction using the value of the partial bit of the bit string and the remaining bit value of the bit string; and
    decode coefficient information of the block to be decoded using the angle of the intra prediction.

8. The information processing device according to claim 7, wherein the value of the partial bit of the bit string is a bit value of a most significant bit of the bit string, and the bit value of the most significant bit indicates which of two angle ranges in the intra prediction the angle of intra prediction belongs to, and the flag information indicates whether the bit value of the most significant bit matches the bit value indicating the estimation result of the angle.

9. The information processing device according to claim 8, wherein the processor generates the bit value indicating the estimation result of the angle by calculating a first index indicating magnitude of a change in a decoded pixel value of a decoded pixel adjacent to a side in a horizontal direction of the block to be decoded in the image, calculating a second index indicating magnitude of a change in a decoded pixel value of a decoded pixel adjacent to a side in a vertical direction of the block to be decoded in the i mage, and comparing the first index with the second index.

10. The information processing device according to claim 7, wherein the value of the partial bit of the bit string is an upper two-bit bit value of the bit string, and the upper two-bit bit value indicates which of four angle ranges in the intra prediction the angle of intra prediction belongs to, the bit value indicating the estimation result of the angle is a bit value of a two-bit bit string, and the flag information includes a first flag indicating whether a first-bit bit value of the upper two bits matches a first-bit bit value of the two-bit bit string, and a second flag indicating whether a second-bit bit value of the upper two bits matches a second-bit bit value of the two-bit bit string.

11. The information processing device according to claim 10, wherein the processor generates the first-bit bit value of the two-bit bit string by calculating a first index indicating magnitude of a change in a decoded pixel value of a decoded pixel adjacent to a side in a horizontal direction of the block to be decoded in the image, calculating a second index indicating magnitude of a change in a decoded pixel value of a decoded pixel adjacent to a side in a vertical direction of the block to be decoded in the image, and comparing the first index with the second index, and generates the second-bit bit value of the two-bit bit string by calculating a third index indicating magnitude of a change in a decoded pixel value in an oblique direction from decoded pixel values of decoded pixels of two lines adjacent to a side in a horizontal direction or a vertical direction of the block to be decoded in the image, calculating a fourth index indicating magnitude of a change in a decoded pixel value in an oblique direction intersecting with the oblique direction from the decoded pixel values of decoded pixels of two lines, and comparing the third index with the fourth index.

* * * * *